Aug. 23, 1955 T. H. FLOWERS 2,716,159
REGISTER TRANSLATORS
Filed Oct. 17, 1950 12 Sheets-Sheet 1

THOMAS H. FLOWERS
Inventor
By Hall & Houghton
Attorneys

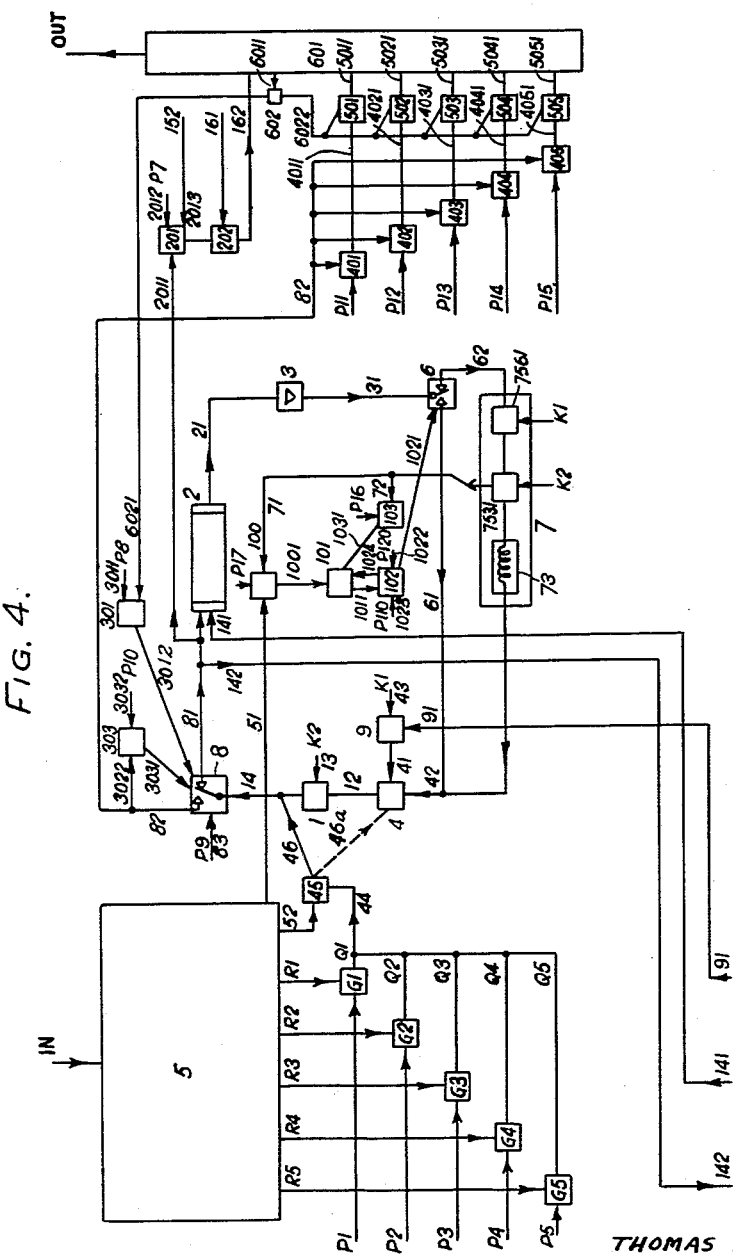

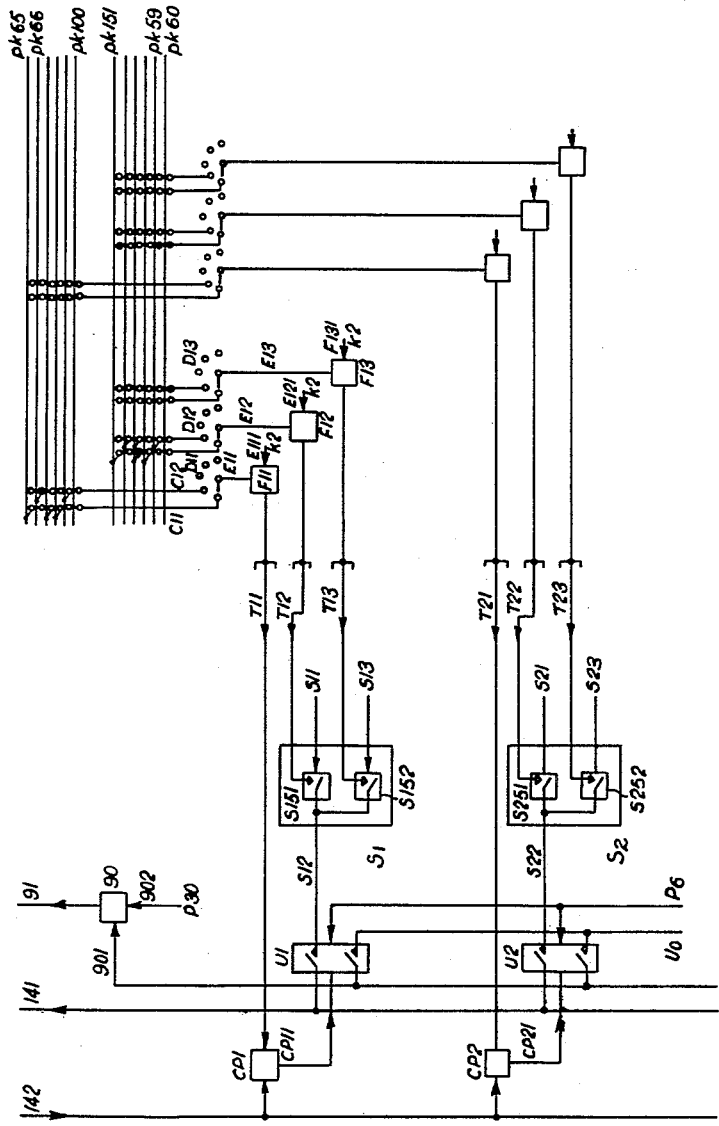

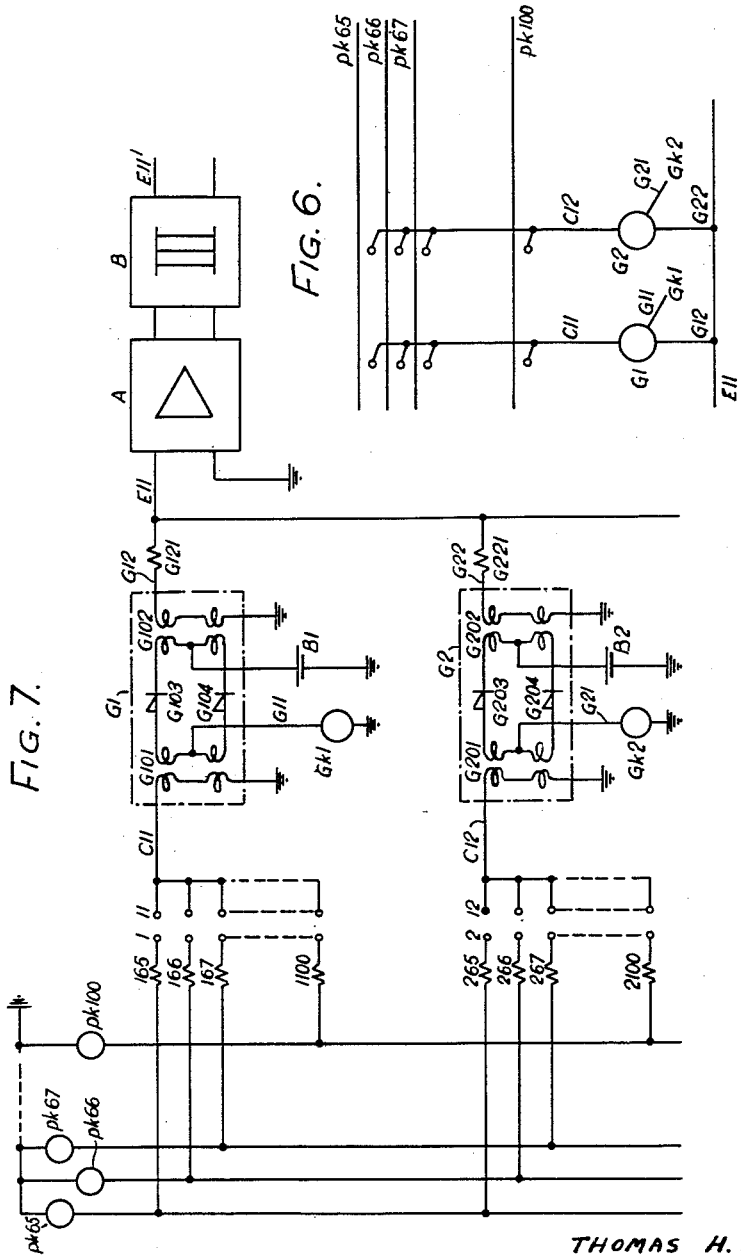

Aug. 23, 1955     T. H. FLOWERS     2,716,159
REGISTER TRANSLATORS
Filed Oct. 17, 1950     12 Sheets-Sheet 5
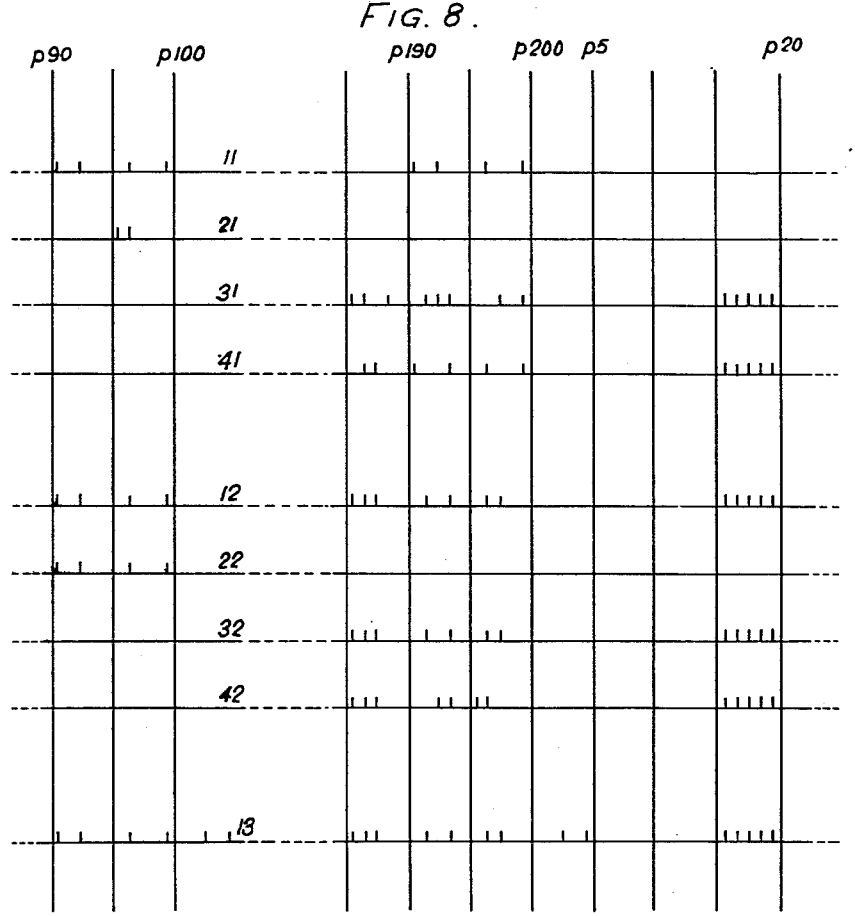

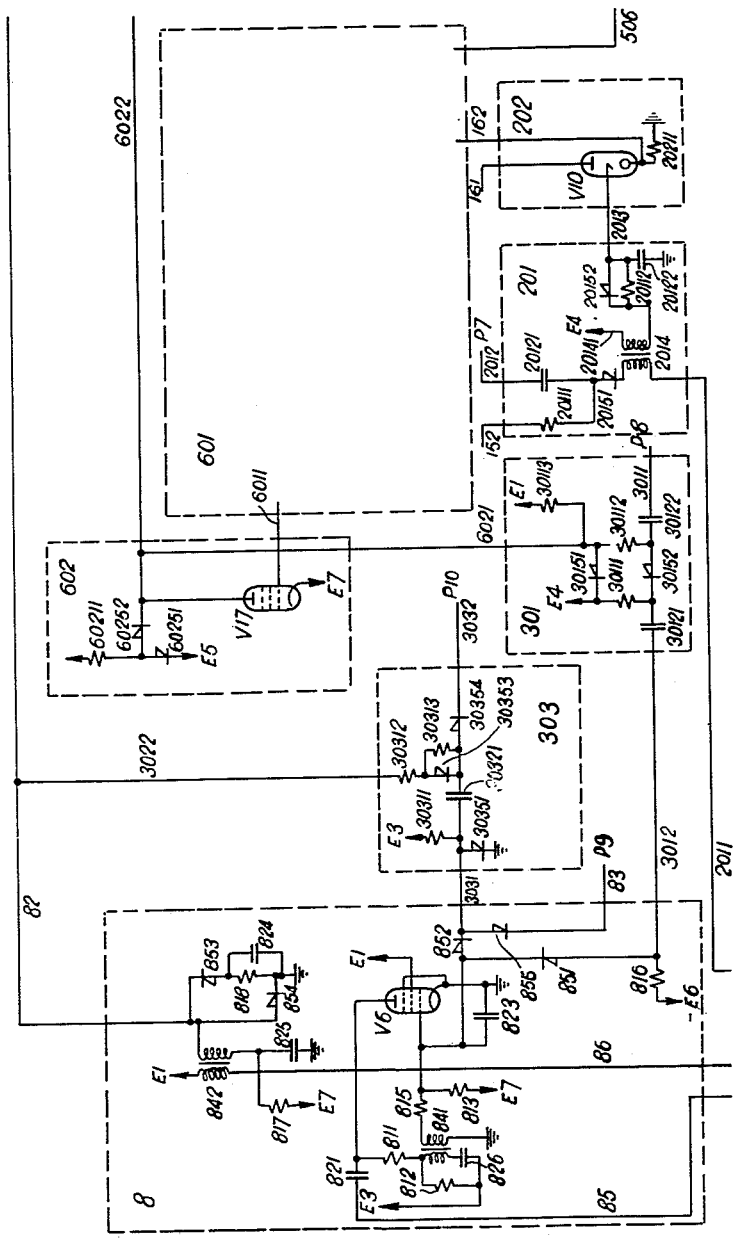

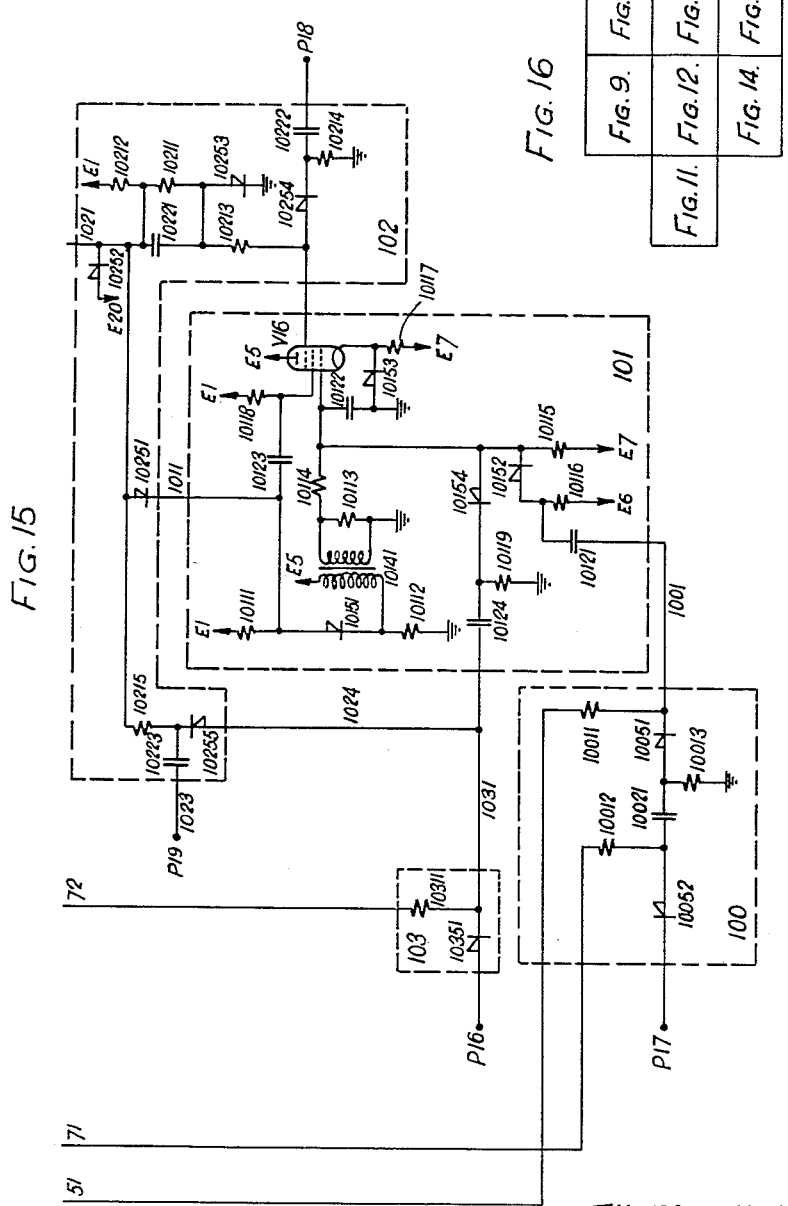

United States Patent Office 2,716,159
Patented Aug. 23, 1955

2,716,159

REGISTER TRANSLATORS

Thomas Harold Flowers, London, England

Application October 17, 1950, Serial No. 190,537

Claims priority, application Great Britain
October 19, 1949

47 Claims. (Cl. 179—18)

This invention relates to register-translators and particularly to register-translators used in automatic telephone systems.

Since the subject matter is somewhat complicated to facilitate its understanding the present specification is indexed by "sub-heads" and "catchlines," which are here listed to constitute an index to the specification, viz:

Part I.—Local and long distance dialing
  A. National numbers
  B. Dialing locally by number only
  C. Zone and exchange area codes
  D. Prefixes for intermediate and long distance calls
  E. Purposes of dialed number
Part II.—Register translators
  A. Requirements
    1. Functions
    2. Originating, transmit and terminating
    3. Call routing
  B. Advantages and objects of present invention
    1. Reducing number of register terminals
    2. Reducing number of rate determinations
    3. Impulse storing and shifting
    4. Duplicate registering of digit pulses
    5. Five part translations
Part III.—General and detailed description
  A. Related prior application
  B. Relation of register to calling circuit and short description of drawings
  C. General description Figs. 1–8
    1. Pulse circulation
    2. Timing nomenclature
    3. Synchronizing and circulation timing
    4. Pulse storing and shifting (Fig. 2a)
      a. Duplicate storage and differentiating number and information digits
      b. Shifting recorded digits
      c. Digit recording system (Fig. 4)
      d. Digit shifting system (Fig. 4)
      e. Digit shifting means
        (1) Inhibition of shifting
    5. Substitution of translation digits
      a. Translator code- and translator-cycles
      b. Translating means
      c. Translation between recording of digits (Fig. 8)
    6. Selection of incoming digits to complete translation
    7. Positioning of translation digits
    8. Repeated translations
    9. Compilation of translator code and translation cycles
      a. Block-number identification
      b. Serial translations
      c. Start sending signal
    10. Exchange number translations
      a. Call diversion
      b. Parallel cycle division
      c. Class of service selection
    11. Relations between pulse circulator and translator
    12. Utilization of registered translations
      a. Preparation for digit extraction
      b. Timing of digit extraction cycle
      c. One digit extracted per cycle
      d. Recasting extracted digit before next digit extracted
    13. Other considerations
  D. Detailed description (Figs. 9–15)
    1. Registering and shifting
      a. Recasting data for pulse circulation storage (Fig. 11)
      b. Record and shift inhibiting signals
      c. Digit pulse entering means 1 (Fig. 12)
      d. Transfer of digit pulses to delay line 2 (Fig. 12)
      e. The supersonic delay line (Fig. 12)
      f. Restoration of delayed digit pulses 3 (Fig. 13)
      g. Pulse shifting switch 6 (Fig. 13)
      h. Retiming digit pulses in primary cycle path 7 (Fig. 13)
      i. Completing time cycle in primary path 7 (Fig. 13)
      j. Timing reinjection of circulated pulses 4 (Fig. 12)
      k. Return of circulated digit pulses to pulse entering means 1 (Fig. 12)
      l. Erase gate 9 (Fig. 12)
      m. Digit pulse shifting by switch 6 (Fig. 13)
        (1) Activation by pulses on wire 71 in cycle division 196—200 for operation during next cycle divisions 120—110
      n. Summary of registering and shifting operation
    2. Extraction of stored digits
    3. Translation digit entry
    4. Shifter operating means (Fig. 15)
      a. Readying for shifting after digit recorded
      b. Effecting shifting at pulse interval 120
      c. Concluding shifting at pulse interval 110
      d. Inhibiting shifting when register full
    5. Translating (Fig. 14)
      a. Code digit comparer CP1
      b. Translation enterer U1
      c. Service class selector S1
      d. Eraser of translated digits 90
      e. Summary of translating operation
    6. Extracting data from register
      a. Information digit detector 201 (Fig. 9)
      b. Extractor actuator 202 (Fig. 9)
      c. Extractor 8 (Fig. 9)
      d. Extraction from entry means 1 (Fig. 12)
      e. Extracted digit pulse analyser 401 et seq. (Fig. 10)
      f. One digit per extraction controller 303
      g. Extraction cycle limiter 8
      h. Analysed digit recaster 501 et seq. 1 (Fig. 10)
  E. Epilogue and claims

*Part I.—Local and long distance dialing*

A. *National numbers.*—In a large automatic telephone network, for example a national system, in which all connections may be set up automatically by the subscribers themselves using dials or key-sets, it is common practice for the subscribers to be given numbers (exchange numbers) by which their lines can be identified on the exchange to which the lines are connected, the term exchange in this specification unless otherwise stated also including a group of exchanges with linked numbers, and for the exchanges to be given numbers (exchange codes) by which they can be identified in the network. The complete number of a subscriber, which will be called his national number, is made up of the exchange code of the exchange to which his lines are connected followed by his exchange number.

B. *Dialing locally by number only.*—It can be arranged that any calling subscriber can connect his line to a line of any called subscriber by dialling the national number of the called subscriber over his line to his exchange. This procedure is, however, wasteful of the time and effort of the subscriber and of switching plant in the exchanges in those cases, which in practice, form the majority of calls made by subscribers and called local calls, for which the calling and called subscribers' lines are connected to the same exchange, and for which the exchange number would therefore suffice. It is for this reason common practice to arrange that for local calls only exchange numbers are dialled, national numbers being dialled only for more distant calls.

C. *Zone and exchange area codes.*—In very large networks the exchange codes may have as many as five or six digits, and it is then of advantage to arrange that subscribers dial only part of the exchange code when this will suffice. For example, five digit exchange codes can be arranged so that the first two digits (called the AB digits) define a zone of the network, and the last three digits (called the CDE digits) an exchange in the zone. Subscribers' local calls can be made by dialling only the exchange number of the called subscriber, intermediate distance connections by dialling the CDE digits followed by the exchange number of the called subscriber, and the full national number only for the long distance calls.

D. *Prefixes for intermediate and long distance calls.*— It is necessary that the switching apparatus be able to distinguish the type of call at an early stage in the dialling, preferably by the first digit. This can be arranged by the system of numbering, for example excluding certain decimal numbers from the first digit of exchange numbers and using such numbers as the first digits of exchange codes. It is often more convenient to use such numbers as prefixes to exchange codes. As an example which will be used for the purposes of further description, exchange numbers, which will be given the general designation N, may have excluded from their first digits two numbers P1 and P2. Local calls are connected by dialling the exchange number N of the called subscriber, intermediate distance calls by dialling P1CDEN, that is prefix followed by the CDE digits of the exchange code and the exchange number of the called subscriber, and long distance calls by dialling P2ABCDEN, that is, the national number of the called subscriber prefixed by P2. In addition, subscribers can obtain certain services, for example, manual operator assistance by dialling service codes which in general consist of one or two digits; subscribers are also connected to manual board or N. U. tone circuits when they mis-dial or for other similar reason. Manual board, N. U. tone and like circuits will be termed service circuits. Other systems of numbering and dialling procedures may be used, those quoted being for the purposes of illustration. The important point which it is desired to stress is that the number of digits which are dialled for any particular call varies according to the service required, the distance of the connection, and also because the number of digits in exchange numbers desirably varies with the size of exchange, according to the exchange to which the called subscriber is connected.

It may also be observed that even in a fully mechanised telephone system, some calls will be set up by operators. So far as this specification is concerned, an operator can be regarded as a subscriber.

E. *Purpose of dialed number.*—The chief purposes of the number which is dialled are to set up the wanted connection, and to arrange for the appropriate charge to be made if the connection is successful. Certain complications arise, however, in carrying out these purposes, of which the following are the more important. Firstly, the number which is dialled may be a dead number, that is, one for which no called subscriber exists, either because the exchange number or the exchange code is dead or both are dead. In this case the calling subscriber is either signalled that the number is unobtainable or connected to a service circuit for example, to a manual board. Secondly, for a successful call the rate which has to be levied may depend on the class of service to which the calling subscriber is entitled. For example subscribers charged a flat rate for local calls and message rate for all other calls may exist on the same exchange as subscribers charged at message rate for all calls. Thirdly, the class of service to which certain subscribers are entitled bars certain connections, for example long distance calls, to them. If they should dial a barred number, it is required that the connection be set up not to the called subscriber but to an appropriate service circuit. Fourthly, in a modern system many features other than those enumerated are desirable. For example, certain subscribers who are temporarily absent from their premises may wish to have incoming calls diverted to a telephone having a number different from that which designates their own.

Part II.—Register translators

A. *Requirements.*—1. *Functions.*—Systems are known in which some or all of the services and features enumerated are given without the aid of register-translators. In general, however, register-translators enable many of the various services and features to be provided more economically and provide greater flexibility in their provision. The following description particularly refers to systems which use register-translators. A register-translator, as part of its functions, receives and records in some form of number storage system the incoming digits as they are dialled by a calling subscriber or transmitted from another register. With this information, together with such information as may be signalled over the switches to the register concerning the class of service to which the call is entitled, the translator has to determine, that is, to translate the incoming information into other information defining the connection to be made, which is usually referred to as the routing, the rate to be levied and all other relevant information.

2. *Originating, transit and terminating.*—In automatic telephone systems which make use of register translators, each exchange is equipped with a number of registers, a free one of which is connected through switches to a calling line to which may be connected a calling subscriber or junction. A register connected to a calling subscriber's line is said to be an originating register. In some systems only originating registers are used. The originating register receives and records each digit of the called number as it is received over the calling subscriber's line, the digits received into the register being designated incoming digits. When sufficient incoming digits to define the exchange to which the called subscriber is connected have been received, a translator provides to the register information, called in this specification the translator translation, which together with a selection of the incoming digits comprises the complete translation which completely defines the connection to be made. In other systems the translation acquired by an originating register is sufficient completely to define the connection to be made for only a limited range of distances from the exchange at which the register is located. For greater distances the translation acquired comprises information sufficient only to establish connection to a limited distance, commonly the next exchange in the line of advance of the call, a second register then being attached via switches to the connection at the next or later exchange, the originating register then sending to the next register such information as will enable it to advance the call a further stage, the call proceeding from exchange to exchange until the final exchange is reached and connection to the called subscriber is established. This method requires the exchange codes to be allocated to the exchanges systematically in dependence on the location of the exchanges in the network, but this presents no great difficulty. A last register in the chain and the one which finally serves to select the called subscriber's line is called a terminating register, and a register between an originating and a terminating register is called a transit register. Each register may have a translator integral with it, or a separate translator adapted to serve a number of registers may be provided. The term register-translator refers to the combination of register and translator by any means. Control of connections by a single originating register becomes uneconomical in large areas due to the large number of exchange codes for which a translator at every exchange would have to provide translations. For this reason the second method using a number of registers in series to determine completely the routing of a call is the more general in practice. The present invention is applicable to either method. As registers used with the second method can be and frequently are arranged to control, without the intervention of a further register, connections within an area around the exchange where the registers are situated, the second method includes the first and will be assumed in the further description. In addition, no distinction in the application of the invention will be made between originating, transit and terminating registers as the invention is applicable to all types and, because of the large number of translations which can be readily provided, is specially adapted to universal registers which act as originating, transit and terminating registers according to their location in individual connections.

3. *Call routing.*—In some systems, no part of the translator translation is given in digital form. The translator translation is given as markings i. e. electrical signals over multiple leads, which effect connection of the call through the exchange at which the register is situated and as a marking which selects such of the dialled digits as shall be transmitted to the next register if any. In the apparatus to which the present invention is applied the translator translation is partly digital and stored in the register, and partly a selection of incoming digits. The important generalisation to be made concerning digital translators of the type to which the present invention relates is that, neglecting for the moment the rate to be levied, the translation from the translator is in four parts, a first part which defines the next step in the advance of the call and is digital in form, a second part comprising digits which together with such incoming digits selected by the third part of the translation, which in the present invention is not digital, enables the call to be advanced beyond the next step, and a fourth part which defines further information concerning the call and which in the present invention comprises information digits. An example will make this point clearer. Suppose a calling subscriber at a minor exchange to dial a long-distance call the dialled number being P2ABCDEN, the following may be a desirable, and with the apparatus to which the present invention is applied, is a possible, course of events. The originating register receives and records the digits one by one, and the associated translator recognises a long-distance call from the first digit P2. It thereupon provides a translation to the register, the first part of the translation comprising digits which the register transmits into the switching system and thus causes the calling line to be connected over a junction to a group centre, the second part of the translation is no digits, and the third part selects all the incoming digits including the prefix digit P2 to be transmitted to the group centre. At the time the translator translation is given, not all of the called number digits may have been received but this is of no consequence; the register transmits them as they come in. The register at the group centre receives and records the incoming digits and the translator recognises the destination of the call as an area defined by the digits P2ABC. It provides a translation comprising as its first part digits which route the call to a group centre in the ABC area, the second part of the translation is the prefix digit P1 and the third part of the translation selects the incoming digits CDEN. The register in the second group centre therefore receives the information P1CDEN, which is the number to be dialled to reach the called subscriber from an intermediate distance and which the register records digit by digit. Assume that the called number is on an exchange dependent on a minor exchange connected to the second group centre, and that the second group centre register is the terminating register. The translator at the second group centre provides a translation having as its first part digits which define the minor exchange, as its second part the digits necessary to select the dependent exchange through the minor exchange and its third part selects the N digits. With this information the terminating register can complete the connection. The fourth part of the translation in each case may be the total number of digits to be received at each stage, with which information each register can determine when it may release. It is important to note that the translator translation digits and re-transmitted digits must be assembled in and used by the register in a recognisable order or form.

The example just quoted not only illustrates the parts of a translator translation but also draws attention to the desirable feature of a register and translator that it may translate from any desired number of the incoming digits. Any register translator must possess this feature to some extent because of the existence of service numbers which have fewer digits than exchange codes. The service numbers in any system are, however, fixed and unalterable and few in number so that inflexible means of recognising them are both adequate and economical. The desirable features of a register-translator in this respect are that it may translate from any number represented by any first number of the incoming digits, that the numbers which it translates may be readily altered to meet the changing needs of the telephone network and that the apparatus be relatively simple.

B. *Advantages and objects of present invention.*—1. *Reducing number of register terminals.*—The size of the register is commonly determined mostly by the number of digits which it has to hold recorded in the storage apparatus. For a national system an originating register may have to store a prefix digit, up to say five exchange code digits, and up to say five exchange number digits, a maximum of perhaps eleven digits together with perhaps six to eight translation digits and two or three information digits for purposes not yet described. The present invention provides a very economical means of storing a large number of digits. The size of the translator is largely governed by the number of exchange codes which it has to recognise together with the number of translation digits it has to provide. For a national system using national numbers including $n$ exchange code digits, $10^n$ codes must be recognised, not by one translator but in the aggregate by all the translators in the system, even though the number of working exchange codes may be only a small fraction of this number. Every one must be recognisable whether it is working or dead, and this combined with the necessity for facilities for making changes often leads to the provision of a terminal or set of terminals for every possible exchange code which if $n=5$, is a considerable number. The fact that only a small fraction of the total numbers are working exchange codes leads in existing systems to a considerable waste of terminals. The present invention provides novel means whereby any code can be used at any time without the necessity for a set of terminals for every possible code. This economy in terminals makes it possible for such facilities as the diversion of absent subscriber calls to other numbers to be readily accomplished by means of a translator, since any one exchange number can easily be selected from among the many thousands of exchange numbers and translated to another number. The present invention also provides a novel system in which the number of sets of terminals to be provided can be less than the number of working exchange codes. This is achieved by supplying a register serially with translations as the incoming digits are received, each translation cancelling the previous one, as will appear from the subsequent description.

2. *Reducing number of rate determinations.*—Turning now to the question of fee or rate determination by the register-translator, the rate of charge for a call commonly depends upon the distance between the calling and called subscribers' exchanges. It would thus appear to be necessary to be able to identify at every exchange at least every working exchange code in the whole network, in order to assess the rate. However, systems of allocating codes to exchanges combined with certain tariff systems are known whereby the number of separate identifications which have to be made is reduced to practical proportions. The feature of the present invention of serial translations permits a further reduction to be made.

3. *Impulse storing and shifting.*—According to the present invention automatic telephone exchange equipment is provided with register translator equipment, the register including impulse storing means in the form of an iterative pulse-storage apparatus in which impulses or groups of impulses representing for example digits, are caused to circulate and in operation of the equipment, further impulses applied to the storing apparatus cooperate with the circulating pulses in effecting switching operations. The iterative pulse-storage apparatus preferably includes a delay line which may be for example of the supersonic type.

Equipment embodying the invention may have two or more registers permanently connected to a common translator serving all the registers. At least one register in such equipment may be provided with iterative pulse-storage apparatus including a supersonic delay line in which the circulating cycle time comprises an integral number of cycle divisions and which is arranged so that each item of information representing for example digits, is stored in the form of coded impulses in a group of cycle divisions, each group containing an identical number of such divisions, means being provided whereby impulses may circulate in the storage system a plurality of times with further means for compensating for attenuation, distortion and phase displacement of the impulses. In such a register, all the digits received as impulses are stored in the impulse storing apparatus in predetermined parts of the circulating cycle in such a manner that impulses representing digits received by the register from subscribers, junctions and the like are always introduced into the storing apparatus at the same predetermined part or parts of the circulating cycle and shifted to a preselected degree together with any impulses circulating elsewhere in the storing apparatus at the time the introduced digit is being shifted.

4. *Duplicate registering of digit pulses.*—In particular equipment embodying the invention impulses representing digits are introduced into the storing apparatus at two parts of the circulating cycle, corresponding cycle divisions in each part of the circulating cycle being separated from those in the other part by one half of the complete cycle so that any digit is stored twice. The shifting of the system of impulses may be effected by means of an electrical delay line switchable by electronic means and having a delay period equal to the time by which it is desired to shift the impulses circulating in the circulating system and arranged for example so that normally the circulating path includes both the electrical delay line and the supersonic delay line but that when advancement of the circulating impulses is required the electrical delay line is by-passed for a period less than the circulating time of the system. The switchable element controlling the advancement of the circulating impulses only operates in a part of the circulating cycle when no impulses are circulating in the electrical delay line. Alternatively, the circulating path may exclude the electrical delay line which, when a retardation of the circulating impulses is required, is switched in to the circulating system for a period less than the circulating time of the system.

Further features of the invention will appear from the following description.

5. *Five part translations.*—Register-translators to which the present invention is applied, and which determine both the route and rate for calls set up through the exchange, provide translations when sufficient incoming digits have been received to define both the route and the rate, each translation comprising five parts, the four parts already defined together with a fifth part which designates the rate for the call.

*Part III.—General and detailed description*

A. *Related prior application.*—The specification of co-pending patent application S. No. 58,864, filed by the present applicant (now Patent 2,683,772, issued July 13, 1954) describes a register-translator and the present invention is an improvement in the form of register-translator described in the specification referred to.

B. *Relation of register to calling circuit and short description of drawings.*—In an automatic telephone exchange system embodying the invention, when an incoming circuit, which may be a subscriber's line, a junction or a circuit from a manual board, signals that a call is required, it is connected over register-hunter or line-finder switches which will be termed register connector switches to a free register in well-known manner. The class of service to which the incoming circuit is entitled is signalled to the register over the register-connector from the calling circuit. It will be assumed for the purposes of illustration that there are three classes of service, one for ordinary subscribers, one for subscribers who are barred calls for which the rate exceeds a given amount, and one for incoming junctions. The signals may be currents transmitted from apparatus associated with the incoming circuits and over separate leads and connections through the register-connectors to the registers, or other means, and have the effect of operating switching devices as will be described later. The register, when connected, signals back to the calling circuit that transmission of the digits designating the call required can be commenced. If the calling line is a subscriber's line, the register sends back dial tone, and if an incoming junction the register sends back a proceed-to-send signal to a register which will be connected to the distant end of the junction. The selection of the signal which the register sends back is controlled by the class of service signal received from the incoming circuit. As a result of the signal sent back, the called number digits are received into the register one at a time from either a subscriber or a distant register.

As each digit is received, it is recorded in a number storage apparatus, the numbers being stored as impulses in the impulse storing system which forms a feature of the invention and with other features of the invention will now be described in greater detail with reference to the accompanying drawings in which:

Figures 4 and 5 are schematic circuit arrangements which together show the connections between separate pieces of apparatus in a system embodying the invention.

Figures 6 and 7 are supplementary to Fig. 5, Fig. 7 showing preferred forms of certain parts of the apparatus shown diagrammatically in Figure 5.

Figure 8 is a further explanatory diagram.

Figures 9 to 15 are detailed circuit diagrams of the apparatus shown in Figures 4 and 5, and Figure 16 is a key diagram showing the manner in which Figures 9 to 15 should be arranged to form an assembled system.

C. *General description Figs. 1–8.*—1. *Pulse circulation.*—Each register contains an impulse storing system comprising a supersonic delay line of the type known for example in electronic computors. The supersonic delay line may comprise a column of mercury terminated at each end with a quartz crystal cut and mounted so that electrical voltage impulses applied to either crystal produce, by the piezo-electric properties of the material, corresponding mechanical impulses which are applied to the mercury in contact with the crystal, the mechanical impulses then being propagated along the mercury column to the other crystal there to cause electrical impulses similar to those applied to the first crystal to appear after a delay determined by the length of the mercury column and the speed of propagation of pressure waves in mercury. An impulse which is applied to the transmit end of the delay line appears at the receiving end after the delay time and then serves to cause a further impulse to be applied to the transmit end of the delay line, the further impulse being similar to the first applied impulse and synchronised with an impulse of a synchronising pulse. An impulse once injected into the system will thus continue to circulate and thus appear as a pulse until stopped by some externally applied signal. The elements of the known system are illustrated in Fig. 1a.

Figure 1A:
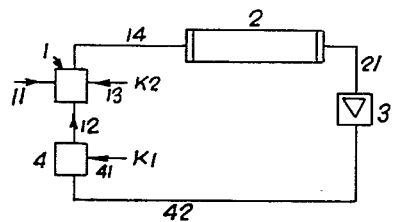
Figures 1a, 1b and 1c, Figures 2a, 2b and Figures 3a, 3b and 3c are explanatory diagrams.

Referring to Fig. 1a, 1 is an apparatus comprising for example a valve trigger circuit of known form having two states of electrical equilibrium, in either one of which it will remain until driven to the other by an externally applied signal. A trigger circuit when in the state of equilibrium in which it rests when the apparatus of which it forms part is idle, is often referred to as being released and as operated when in the other state. Apparatus 1 emits over a lead 14 alternating current at a suitable frequency when an impulse is received over either of the leads 11 or 12 and continues to do so until an impulse, one of a continuous sequence of regularly spaced impulses called the K2 pulse, is received over lead 13. The A. C. impulse thus generated is communicated over lead 14 to the transmit crystal of a supersonic delay line 2, received at the receiving end of the delay line after the delay time and transmitted over lead 21, to amplifier 3 and over lead 42 to an apparatus 4. The amplifier 3 makes up some or all of the power loss in the delay line. The apparatus 4 has connected to it, over lead 41, a source of continuously recurring synchronising impulses K1, and emits a synchronising K1 impulse over lead 12 when an impulse conincident in time with a K1 impulse is received over lead 42. Lead 12 is connected to apparatus 1 thus to complete a loop over which impulses may be transmitted. A correctly timed impulse injected into the system over lead 11 continues to circulate round the loop described, and the number of such impulses which can be circulated is dependent upon the delay time of the delay line, the time spacing of the impulses, the time spacing of the impulses being the period of the impulses of the K1 and K2 pulses.

Figure 1B:
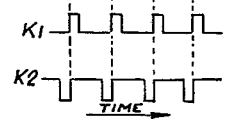
Figure 1C:
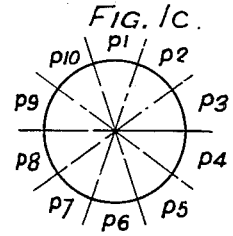

2. *Timing nomenclature.*—A time diagram of a pulse circulating system having a capacity of ten pulses is shown in Fig. 1c. The register cycle is shown as a circle which is divided into 10 equal sectors designated p1 to p10. The sectors represent equal fractions of the cycle during each of which an impulse or a pulse may occur. These fractions will be designated cycle divisions each division being designated by the designation of the sector which it occupies and an impulse or a pulse occurring in a division taking the same designation as the division. At any given instant the phase of the cycle varies at different points in the circulation loop. Register time is the phase of the cycle at the input to the supersonic delay line. If the cycle divisions in the example being taken are each 10 microsecs., the cycle period is 100 micro-secs.

3. *Synchronizing and circulation timing.*—Fig. 1b shows the regularly time spaced K1 and K2 pulses, the beginning and ends of the pulse periods represented by the sectors in Fig. 1c and relative to register time being indicated by dotted lines. Both the K1 and K2 impulses are short in time duration compared with the pulse period, and it will be seen from Fig. 1b that a K1 impulse occurs immediately after the beginning, occupying, say, the first and second micro-sec. and a K2 impulse occurs immediately before the end, occupying say the ninth and tenth micro-secs. of each pulse period. An impulse which is injected into the system over lead 11, Fig. 1a is caused to synchronise with a K1 impulse. A. C. impulses which are generated by the apparatus 1 and transmitted to the delay line over lead 14, start with a K1 impulse and end with the next K2 impulse and are therefore of eight microseconds duration. The time delay provided by the supersonic delay line and amplifier is nominally 97 micro-seconds, so that an impulse transmitted over lead 42 should arrive 3 microsecs. before a K1 impulse starts and persist for 3 microsecs. after the K1 impulse ends. Apparatus 4 emits a K1 impulse over lead 12 if, coincident with the K1 impulse, an impulse is received over lead 42. The 3 microsecs. overlap at each end represents the tolerance available on the time delay. A K1 impulse emitted over lead 12 commences and the next K2 impulse over lead 13 terminates a new A. C. impulse transmitted by apparatus 1 over lead 14 to the delay line 2, which new impulse will in turn cause a still further impulse to be transmitted 100 microsecs. later and so on.

Figure 2A:
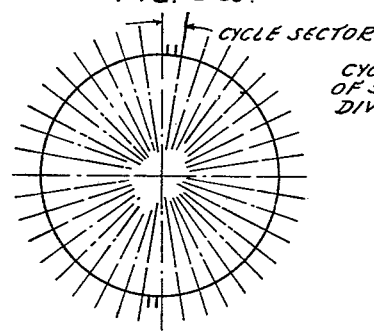
Figure 2B:
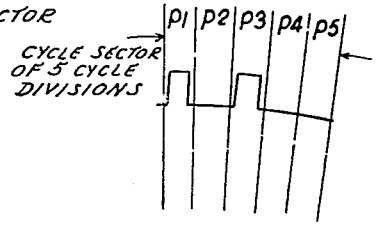

4. *Pulse storing and shifting (Fig. 2a).*—Pulse storage systems of the type described are usually adapted to store many more than 10 pulses each comprising impulses of much shorter duration than 8 microsecs. The application of the invention will be illustrated by an example in which the storage system has a capacity for 200 pulses, designated p1 to p200, each impulse of duration 0.8 microsec. and each cycle division 1 microsec., the A. C. of the impulses in the delay line having a frequency of 11 mc./s. and a nominal delay round the circulating path of 199.7 microsecs. Fig. 2a illustrates this system, the cycle being represented by a circle, the circle being divided into forty equal sectors, each sector comprising five cycle divisions, a combination of pulses in the five divisions corresponding, according to a code, to a digit which is stored, the figure showing a digit stored in each of the sectors comprising cycle divisions p1 to p5 and p101 to p105. Fig. 2b is an enlarged view of the cycle divisions p1 to p5, and shows impulses in the divisions p1 and p3 and blanks, i. e. no impulses in divisions p2, p4 and p5.

*a. Duplicate storage and differentiating number and information digits.*—The circulating system thus has a capacity for storing forty decimal digits, which number is far in excess of the number ordinarily required for a telephone system but is necessary because of a feature of the invention to be explained in greater detail later that called number digits are recorded twice on the delay line as shown in Fig. 2a, the digit in the divisions p101 to p105 being the same as the digit in divisions p1 to p5. The number of cycle divisions allotted to each digit has to be at least sufficient to provide a number of combinations of pulses in the cycle divisions at least equal to the numbers of a digit but is otherwise a matter of choice. Five pulses taken two at a time provide ten combinations which are convenient for the numerals 0 to 9. Combinations of three or more pulses are then convenient for the information digits which can be recognised as such by the fact that they contain more than two pulses, but this is again a matter of choice and is not essential.

b. *Shifting recorded digits.*—In Fig. 1a, an impulse pulse injected into the system over lead 11 has to be accurately timed to coincide with the beginning of the cycle division which it is to occupy in the circulating storage system, and means must be available to generate an accurately timed impulse for every cycle division which may be occupied. In the system embodying the invention the necessity for a large number of differently timed impulses is avoided with accompanying simplification of the apparatus. This is accomplished by a set of n fixed time pulses which are used to record each digit as it is received, in conjunction with means for reducing or increasing the cycle period for one cycle by n cycle divisions whereby the recorded digits may be advanced or retarded respectively in time relative to the fixed recording times. This is shown in Fig. 4 which together with Fig. 5 shows in schematic form the operation of a register translator embodying the invention in which n is five and the cycle time is reduced by five cycle divisions to advance the recorded digits in the register cycle.

c. *Digit recording system (Fig. 4).*—Referring to Fig. 4, the lead IN is the input lead to the register and over this lead the incoming digits are received. It is connected to an apparatus 5 which for each digit which it receives, marks with continuous electrical signals a selection of the leads R1 to R5 connected to it according to the digit and the code used to represent the digits. Apparatus 5 when it receives a complete digit also sends a signal for a short period for example 10 millisecs., over lead 51 and a shorter signal over lead 52, the signal over lead 52 commencing after and terminating before the signal over lead 51. The leads R1 to R5 are each connected to switching devices which will be called gates G1 to G5, to which are also connected leads P1 to P5 and Q1 to Q5 respectively. The leads Q1 to Q5 are commoned by a lead 44 to a device 45 to which the lead 52 is also connected.

Figure 3A:
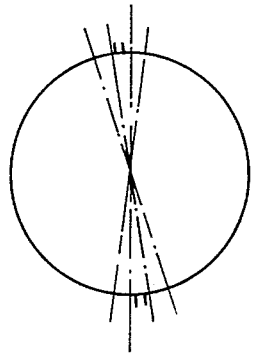
Figure 3B:
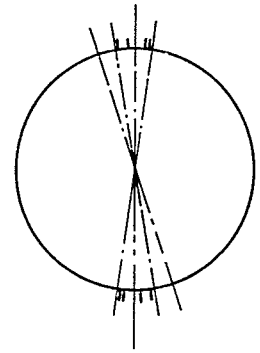
Figure 3C:
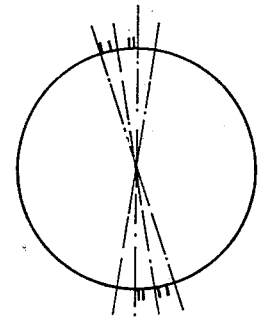

In one arrangement of the apparatus lead P1 has applied to it a pulse the impulses of which are of the same duration as and which occur in synchronism with the register time of cycle division p1 and p101; P2 has applied to it similar impulses for the cycle divisions p2 and p102 and so on to P5 having applied to it pulses corresponding to the cycle divisions p5 and p105. In another arrangement the impulses applied to the pulse lead P1 are of the same duration as and occur about 0.3 of a cycle division before the register time of cycle divisions p1 and p101; P2 having applied to it similar impulses for the cycle divisions p2 and p102 and so on to P5 having applied to it pulses corresponding to the cycle divisions p5 and p105. In either case the pulse over lead P1 is not communicated over gate G1 unless there is a signal appiled over lead R1 and similarly for the remaining gates and leads. Hence when a digit is received by the apparatus 5, the device 45 receives, over the leads Q1 to Q5 a combination of pulses corresponding to the cycle divisions 1 to 5 and a similar combination corresponding to the cycle divisions 101 to 105 the pulses in one arrangement being synchronous with and in the other about 0.3 pulse period in advance of register time. The device 45 is adapted to communicate these pulses over lead 46 or 46a only during the period that a signal is received over lead 52 from the apparatus 5. Lead 46 which may be used when the pulses on leads P1 to P5 are synchronous with the register time, is joined to the lead 14 which corresponds to the lead 14 of Fig. 1a. When the pulses on leads P1 to P5 are arranged to occur about 0.3 of a cycle division before the register time the device 45 is connected over a wire 46a (shown as a broken line) to device 4 which is similar to and occupies the same place in the circulating system as the device 4 of Fig. 1a. Device 4 in Fig. 1a omits over lead 12 when a K1 impulse corresponds with a circulated impulse applied over lead 42. Device 4 in Fig. 4 omits over lead 12 when a K1 impulse from device 9 coincides with either a circulated impulse applied over lead 42 or an impulse applied over lead 46a in the event of the pulses over leads P1 to P5 being timed about .3 of a pulse phase in advance of the cycle time so that when communicated to lead 46 they commence before and end after the K1 impulse they are adapted to cause to pass on to lead 12. Lead 12 is connected to a switching device 1 having connected to it over lead 13 a pulse source K2 and being connected over lead 14 to a supersonic delay line 2, all similar to similarly designated parts of Fig. 1a, except that lead 14 is not directly connected to the supersonic delay line 2 but via a switching device 8 and a lead 81, although these provide a through connection at the time the incoming digits are recorded. Hence pulses over leads 46a cause cycle pulses to be injected into the circulating system. When lead 46 is used the pulses on it are already synchronous with cycle pulses and are injected into the circulating system in the correct time sequence. In either case the pulses are maintained circulating as previously described. The fact that the pulses over lead 46 are maintained for a number of cycles is of no consequence. Second and subsequent applications of the impulses of a pulse coincide with corresponding impulses which have travelled round the circulating system and are communicated to device 4 over lead 42 and together give rise to the single further impulse required to maintain the circulation. To complete the recording, the signals from apparatus 5 over the leads R1 to R5, and 51 and 52 are removed and the process can be repeated for a further digit. The purposes of the signals over leads 51 and 52 will be explained later.

d. *Digit shifting system (Fig. 4).*—Having recorded a digit, it is advanced in time by five cycle divisions in the following manner. The total delay round the circulating system is normally made up of the delay through the components of the circulating system which components comprise the supersonic delay line 2 connected over lead 21 to the amplifier 3 in turn connected over lead 31 to a switching device 6, shown as comprising a changeover contact for the purposes of illustration, thence through a device 7 consisting of a retiming circuit comprising devices 7561 and 7531 and joined to an electrical delay line 73 having a delay of 5 microseconds and thence to device 4 via a lead 42. The switching devices 6 will be referred to later but for the present they can be regarded as devices through which the pulses can pass unhindered over the path described. For a 200 pulse storage system the delay through the supersonic delay line 2 and amplifier 3 is thus nominally 194.7 microsecs. To advance a recorded digit in time by 5 microsecs., the switching device 6 is operated during a blank part of the cycle and for one cycle of circulation. Device 6, when operated, causes the 5 micro-second delay line 7 to be switched out of the circulating system and replaced by the no-delay lead 61. Pulses which occupied the cyclo divisions p1 to p5 and p101 to p105 then occupy the divisions p196 to p200 and p96 to p100 respectively. A further digit may then be recorded in the cycle divisions p1 to p5 and p101 to p105, the two digits then being advanced in time by 5 microsecs. and so on. The timing diagram Fig 2a as previously referred to shows a single digit recorded in cycle divisions p1 to p5 and p101 to p105. Figs. 3a, 3b and 3c are similar diagrams showing the successive operations. Fig. 3a shows the first digit shifted, Fig. 3b shows the second digit recorded and Fig. 3c shows the first and second digits shifted. In this simple manner a large number of digits may be recorded in the serial order in which they are received, the record comprising pulses which are reproduced in cyclic order at a point in the system, and which can be identified by their position in the register cycle. The K1 and K2 and P1 to P5 pulses are common to all registers connected to a common translator, so that the cycles of all such registers are in synchronism.

*e. Digit shifting means.*—The means by which the shift operation can be effected is shown in Fig. 4. In the normal circulating system are included devices which by means of K1 and K2 pulses respectively re-synchronise the pulses appearing on lead 62. By means of devices 7561 and 7531 the timing tolerances for the electrical delay line 73 may be made less stringent. The circulating pulses at device 7531 pass into the electrical delay line 73 and also over wire 71 to a device 100 which may contain a trigger, to which lead 51 is also connected. Also connected to device 100 is a pulse lead P17 over which pulses occupying cycle divisions $p195$–$p200$ are communicated. The pulses over lead P17 cooperate with those over lead 71 to operate device 101 if there had been any circulating pulses at register times $p1$ to $p5$, that is pulses corresponding to cycle divisions $p196$ to $p200$ at the input of the 5 microseconds electrical delay line and indicating that there is a recorded digit to be shifted.

(1) *Inhibition of shifting.*—Device 101, which may comprise a trigger circuit, is also connected over lead 1031 to a device 103 which has the function of releasing device 101 in the event of the storage system being filled, this being effected in the following manner: The pulses on lead 72 are fed to device 103. The device is also connected to a pulse lead P16 over which it receives pulses occupying cycle divisions $p116$–$p120$. If a pulse from P16 coincides with a pulse on lead 72, device 103 operates and over lead 1031 releases device 101. That is, if there have been pulses on lead 81 at register times $p121$–$p125$ the storage system is regarded as being full and the release of device 101 under these conditions prevents the shift operation from taking place.

The shift operation is also inhibited if a signal is applied on lead 51 to device 100 in the event of device 5 receiving a digit to be stored. Providing device 101 is not released by device 103 it signals device 102, which may comprise a trigger, over lead 1011 and device 102 operates when a pulse in cycle division time $p120$ is applied to lead 1022 coincidentally with a signal on lead 1011. When device 102 operates the device 6 is operated over lead 1021, device 6 when operated reducing the cycle time by 5 microseconds by eliminating the electrical delay line 7. Device 102 is also connected to a lead 1023 on which appear pulses in the cycle division time $p110$ in such a manner that any pulse on lead 1023 releases the device 102. Hence, providing a shift is required as indicated by device 100 and providing also that the storage system is not full, as indicated by devices 103 and 101 cooperating, device 102 is operated for just less than one register cycle, from register time cycle divisions $p120$ to $p110$. At the time of operation the delay line 7 is empty of pulses so that none is lost and at the end of the operation of device 6, all the pulses in the circulating system will be advanced 5 micro-secs. in the registered cycle. Device 100 when operated by a signal over lead 51, serves to disconnect device 101 from the lead 71 and thus cooperate with device 45 operated by the signal over lead 52 to prevent the shift operation taking place when a digit is being recorded. It is to be noted that the shift operation is initiated by any pulses applied to the delay line 2 at register times $p1$ to $p5$. This event arises not only from recorded incoming digits but also from translation digits as later described, which may be brought into this position in the cycle by shift operations initiated by recorded digits.

5. *Substitution of translation digits.*—Further features of the invention are concerned with means whereby the incoming digits may be translated to route, charging rate, and other digits, the recorded digits in the cycle divisions from $p101$ to $p200$ being replaced by translation digits as will now be described. The right hand side of Fig. 5 shows diagrammatically part of the translator which is common to a group of registers. Each lead $pk65$ to $pk100$ and $pk151$ to $pk60$ is connected to a pulse generator, not shown, which generates a pulse coincident with the register K1 pulse which commences a register cycle pulse having the same designation as the lead when the $k$ is omitted from the lead designation. The minimum number of pulse generators and leads necessary is dependent on the number of incoming digits and translation digits to be recorded. The number shown is for the purpose of illustration only. A number of leads of which two, C11 and C12, are shown are each connected to a terminal of a distributor D11 shown for the purposes of illustration as a contact arm rotating over contacts, although in carrying the invention into effect the arrangement described later would be preferred. Each lead C11 and C12 is also connected to a set of terminals, each terminal being connected to the lead through a resistor or other decoupling device not shown in the figure. By connecting the terminals of a lead C11, C12 to the appropriate leads $pk65$ to $pk100$, any desired number of the pulses $pk65$ to $pk100$ can be caused to be emitted over lead C11, C12 . . . in a cycle which has the same period as a register cycle. The arm of the distributor D11 advances from contact to contact at the rate of one contact per register cycle and moves in a blank period in the register cycles which are arranged to have a blank period at an appropriate part of the cycle. The arm of the distributor is connected over lead E11 to a switching device F11 which is similar to the device 1 of Fig. 1a, that is, it starts an impulse over a lead, in this case T11, in response to an impulse, in this case over lead E11, and ceases the impulse in response to a K2 impulse over lead E11, the K1 pulse of the registers being common to the K2 pulse of the translator. The periods of the impulses which are emitted over lead T11 are therefore coincident with and their duration equal to those of the registers at the inputs to the supersonic delay lines. The pulses which are emitted over lead T11 are called translator pulses and are emitted in cycles called translator cycles, the period of a translator cycle being an integer multiple of the period of the register cycle and determined by the distributor D11. The pulses of a translator cycle may be readily compiled, and recompiled when desired, to a desired order.

*a. Translator code and translator cycles.*—A feature of the invention is that translator cycles are provided in sets, each set comprising at least two cycles, one called a translator code cycle and the remainder translator translation cycles. In Fig. 5 the translator cycle of pulses which is applied to lead T11 is a code cycle and one of a set, the remaining two of which are translation cycles generated in a manner similar to that of the code cycle and applied one to each of the leads T12 and T13. A second set of translation cycles is applied, the code cycle to lead T21 and translator cycles to leads T22, T23. The code cycles contain pulses in the range of cycle division $p65$ to $p100$ and the translation cycles pulses in the range $p151$ to $p60$. In the figure terminals for the leads to the distributors are shown for only those ranges of cycle divisions.

*b. Translating means.*—Apparatus suitable for performing the functions of the apparatus shown in Fig. 5 between the pulse supplies $pk65$ . . . $pk60$ and the leads T11 . . . T23 will now be described. Fig. 6 illustrates apparatus performing the functions of distributor D11 and shows how the rotating distributor of Fig. 5 can be replaced by a plurality of gating circuits G1, G2 etc. In Fig. 6 the leads $pk65$, $pk66$ . . . $pk100$, C11, C12, and E11 correspond to the similarly marked leads in Fig. 5 and the gating circuits G1, G2 . . . with their control leads G11, G21 . . . form the distributor D11 of Fig. 5. As was explained with reference to that figure sets of terminals connected to leads C11 and C12 can be connected to any of their appropriate pulse leads $pk65$ to $pk100$ so that any desired combinations of pulses $pk65$ to $pk100$ can be caused to be emitted over each of the leads C11, C12 . . . in a cycle which has the same period as a register cycle. Over the gate circuit control leads G11, G21 . . . pulses $Gk1$, $Gk2$ . . . are applied to the gating circuits. The pulse $Gk1$ fed over lead G11 to gate circuit G1 allows passage of pulses from lead C11 to lead G12 only during the impulses of pulse $Gk1$. Each impulse of the pulses $Gk1$, $Gk2$ . . . lasts for a time equal in length to a register cycle and starts and stops in a blank period of the register cycles. All pulses $Gk1$, $Gk2$ . . . have the same impulse repetition rate which is an integer times the register cycle repetition rate, the integer being equal to the number of gating circuits connected to lead E11. The impulses of the pulses $Gk1$, $Gk2$ . . . are uniformly spaced in time.

Fig. 7 shows in more detail the apparatus shown in block schematic form in Fig. 6. Pulse generators $pk65$, $pk66$, $pk67$ . . . $pk100$ are connected via decoupling resistors 165, 166, 167 . . . 1100, 265, 266, 267 . . . 2100 etc. to groups of terminals 1, 2 . . . . Associated with each of these groups of terminals is another group of terminals 11, 12 . . . and these second groups of terminals are connected each to their own lead C11, C12. . . . Straps between any of the opposite pairs of tags in the groups 1 and 11 connect the associated pulse generators to the lead C11. The leads C11, C12 . . . are connected to gate circuits, C11 to gate circuit G1, C12 to gate circuit G2 and so on. Each gate circuit compromises two transformers and two rectifiers and each gate circuit is connected a source of bias E. M. F. and a pulse generator. Considering gate circuit G1, in the absence of an impulse from pulse generator $Gk1$, the bias source B1 biasses rectifiers G103 and G104 to their high incremental resistance states thus presenting a high attenuation between leads C11 and G12. When an impulse is generated by pulse generator $Gk1$ the amplitude of the impulse is arranged to exceed the E. M. F. of bias source B1 and rectifiers G103 and 104 are biassed to their low incremental resistance states thus allowing signals on lead C11 to pass to lead C12 with little loss. G1, G2 . . . are connected to lead E11 through decoupling resistors G121, G221 . . . and lead E11 is shown connected to an amplifier A which makes up for the loss between the pulse generators $pk66$—$pk100$ and lead E11. As there will be a delay in transmission between those two parts of the apparatus to pulse generators $pk66$—$pk100$ are arranged to generate impulses somewhat in advance of their wanted times and delay line B is provided to bring the impulses at E11 to their wanted time positions.

c. *Translation between recording of digits (Fig. 8).*— A further feature of the invention is that translation is effected in an interval between the recording by a register of two incoming digits. This feature will be explained by reference to Fig. 8. Fig. 8 shows along line 11 the impulses of a cycle of a register which has received, recorded and shifted two incoming digits. The pulses of the first digit occupy the cycle divisions $p91$ to $p95$ and $p191$ to $p195$, and the second digit the periods $p96$ to $p100$ and $p196$ to $p200$. The digits recorded in the series of periods ending with $p100$ will be called the first appearance of the recorded incoming digits and those ending with $p200$ the second appearance of the recorded incoming digits. Along line 21 is shown a group of impulses in a part of a translator code cycle equal in time to a register cycle. Each group of impulses in a translator code cycle corresponds to a first appearance in a register cycle of a series of incoming digits for which a translation is required. The compiling of the translator code cycles is explained in more detail later but for the present it may be assumed that if a translation is required for the incoming digits represented by the pulses shown along line 11, a translator code cycle will contain an identical series of pulses which will coincide in time with a first appearance of the register pulses at some part of the translator cycle. The impulses shown along line 21 do not correspond with those of line 11 but to another series of incoming digits for which translation may be required at some other time by any of the registers connected to the translator. Along lines 31 and 41 are shown the impulses of translation pulses corresponding to the code pulses of line 21 for two different classes of service. The compilation of the translator translation cycles is also explained in more detail later but for the present it may be understood that the translation corresponding to a group of code pulses is a group of pulses occurring at times after the group of code pulses to which they refer and before the next group of code pulses.

A further register cycle with the corresponding part of the translator code and translation cycles is shown in Fig. 8 along the lines 12, 22, 32, 42 which show the impulses respectively of the register, translator code, and translator translations for two classes of service. In this case the first appearance of the register impulses, in cycle divisions $p91$ to $p100$, on line 12 coincides with the translator impulses on line 22. The second appearance of the register pulses is thereupon suppressed by the register, and substituted by the pulses initiated by impulses selected from one of the translation cycles in the example shown by the impulses along line 32 and called the digital translation. The register cycle now consists of the first appearance of the incoming digits and the digital translation and will continue to circulate in this form until some further operation of the register occurs. The digital translation comprises all those parts of the translation previously defined except the third part, that is, the digital translation contains in a recognisable order or form the digits which define the next step in the advance of the call, digits which together with incoming digits selected as yet to be explained, will advance the call beyond the next step, digits which convey additional information about the call such as the total number of incoming digits to be expected, and digits which define the rate for the call. The selection of the incoming digits to complete the translation will now be explained.

6. *Selection of incoming digits to complete translation.*—As already described in connection with Fig. 5, an incoming digit received in a register is coded into a combination of continuous signals applied to five leads and corresponding pulses in cycle divisions $p1$ to $p5$ and $p101$ to $p105$ are injected into the circulating system to store the incoming digit in two appearances. The pulses are then advanced five pulse periods by the shift operation; a further digit is similarly recorded in pulse periods $p1$ to $p5$ and $p101$ to $p105$ and advanced together with the first digit by the shift operation and so on. It has also been described how, by a translation operation, a digital translation is substituted for the second appearance of the stored incoming digits when a group of digits in a translator code coincides with the first appearance of the stored incoming digits in the register. It is a feature of the invention that the translation operation takes place in the interval between the storing of two incoming digits, to which end the period of the translator cycle must be less than the stated interval. If the period were greater than the interval, the shift operation which follows the recording of a digit would occasionally prevent coincidence of the translator code and register digits and therefore prevent the translation operation. This feature of the invention determines the third part of the translation, viz. the selection of incoming digits to complete the translation. The incoming digits which are received and stored after the translation operation are of course recorded as described; the digital translation being shifted along with the new digit. In applying the invention, incoming digits received prior to the translation operation and forming part of the translation are included in the required order in the digital translation, and the digital translation is arranged in the translator translation cycle in position such that when transferred to a register cycle the incoming digits recorded after the translation fall into position to complete the translation. This will become clearer when the compilation of the register code and translation cycles has been described.

7. *Positioning of translation digits.*—The positioning of the digits in the translation is also illustrated in Fig. 8. The group of five pulses $p16$ to $p20$ in the translation cycles form an information digit. The line 13 shows a register cycle after the cycle of line 12 and after a further incoming digit has been recorded but before the shift operation; the further digit follows the translation digit in the periods $p195$ to $200$ and still further digits will fill up the digit spaces between the further digit and the information digit. It may here be observed that there can be more than one information digit and the information digits do not of necessity have to be located at the end of the translation. An information digit, when it becomes located in the pulse periods $p1$ to $p5$ by the recording of an incoming digit and subsequent shift operation, will itself bring about a further shift operation and if a further incoming digit is recorded it will follow in the register cycle the information digit. It may also be observed that if the digital translation is located in the translator cycle so that when transferred to the register cycle a translation digit falls in the pulse periods $p1$ to $p5$, the translation operation will be followed by a shift operation which places the translation in the desired portion of the register cycle and advances the first appearance of the incoming digits in the register cycle by five pulse periods. A further incoming digit will then be recorded in the first appearance of the incoming digits with a blank digit space between it and the preceding digits, of which feature use is made as described later.

8. *Repeated translations.*—To complete the description of the translation process it is necessary to add that in the application of the invention, the translation operation can occur more than once in one call. A first translation occurs after a certain number of incoming digits have been recorded, a first digital translation being substituted for the second appearance of the recorded incoming digits. In certain circumstances to be described later, when a further digit or further digits have been recorded, a second digital translation is substituted for the first digital translation by a second translation operation identical with the first.

9. *Compilation of translator code and translation cycles.*—The compilation of the translator code and translation cycles will now be described. These cycles are dependent on one another and separately are partly dependent on certain general principles, partly on the classes of service offered and partly on the exchange switching system in use.

a. *Block-number identification.*—The first principle which the codes have to satisfy is that together they must identify every possible complete number that a subscriber may dial. A complete number is one which has the minimum number of digits demanded by the numbering system and a possible complete number is any complete number whether it represents a working exchange line or not. If a national system is considered in which the subscribers national numbers are represented by $P_2$ ABCDE N where N may be comprised of four digits, it would appear that the possible numbers total $10^{10}$. In actual practice the possible numbers are far less than $10^{10}$ but still impossibly large for each number to be identified by one piece of apparatus and most of the numbers are dead numbers. The known means by which this number is reduced to practical proportions, comprises identification of blocks of numbers each by a single identification. A block of numbers is a series of numbers having identical digits in the first $n$ places, $n$ being any number and the block being designated by a number formed by the first $n$ digits. A translation block of numbers is a block of numbers requiring identical digital translations.

The number of translator codes is therefore dependent on the number of translation blocks of numbers and the number of these blocks is dependent on their sizes, the larger the blocks the fewer the translation codes required. The size of the translation blocks is a complicated problem an understanding of which is not material to the present invention. It is sufficient to say that for a given network arranged according to known principles, the complete translations required at any given exchange in the network can be written down and will then fall into translation blocks which together can satisfy any possible complete number than can be signalled at that exchange. Having done so, the compilation of the translator codes and translations to be made up into translator cycles in accordance with the invention proceeds in the following manner: The first incoming digit may be one of the ten numbers 1 to 9 and 0. Each number is considered individually. If it designates a tranlation block of numbers all beginning with the number, a translator code corresponding to the number is provided in a translator code cycle, and the corresponding digital translation is provided in the part of a translator translation cycle corresponding to the translator code. If the number does not designate a translation block of numbers, there are ten possible numbers for the second digit and each of these is considered individually. If in conjunction with the first digit number it designates a translation block of numbers, translator codes and digital translations are provided, as before, in the respective cycles. The parts of the cycles in which they are located need bear no particular relation to any other code or digital translation in the cycle. If in conjunction with the first digit number the second digit number does not designate a block of numbers, there are ten possible numbers for the third digit each of which is considered separately, and so on. In this way all the possible complete numbers are provided with translations, and the number of translator codes and translations required in practical systems can be kept down to practical proportions. Apparatus operating in accordance with the invention permits a further reduction to be made. Consider for example a series of intermediate distance codes of the form $P_1$ CDE. Of the 1000 numbers in the series, in practical systems more than 900 may be dead numbers. Of the 1000 numbers, there may be 80 blocks each of ten dead numbers, which would need 80 codes; the remaining 200 numbers would need separate codes to determine the dead numbers among them and the translations for the working codes, a total of 280 codes. Because of the necessary provision for making changes in the numbering, known systems provide terminals for each of the 1000 codes although provision for a corresponding number of translations may not be made.

b. *Serial translations.*—With the present invention it would be necessary to provide no more than 280 codes in the translator code cycle and in fact many fewer can be made to suffice by the utilisation of the feature of serial translations. A translator code for P1 in the example being taken allows a translation which will direct to dead code number signalling equipment all calls providing numbers which start with P1 and contain at least 4 digits. Translator codes and translations for each of the working numbers beginning with P1 permit a working number to cancel the spare code translation and substitute the working number translation. This by itself in the example quoted reduces the number of translator codes from 280 to about one hundred but as many of the working translator translations fall into translation blocks when the dead numbers have been removed, the final number of translator codes required may be substantially less than 100 without any limitation to the numbering or change of numbering. Still further reduction is possible by further utilisation of the feature of serial translations. The, say, 100 working codes in the example being taken, fall into 20 number blocks each of 10 numbers. A number, say 5, of the blocks will be translation blocks and need only a single digital translation. Others of the number blocks will represent codes of exchanges in areas of the country across which a tariff boundary or other feature will cause some of the working numbers in the block to need one digital translation and the remainder a second digital translation. Still further of the number blocks will represent areas of the country across which two tariff boundaries or other features will cause the working numbers to fall into three groups each with a different digital translation and so on. For each number block needing more than one digital translation, the digital translation relating to one group, preferably the largest, is allocated to the whole number block which is identified by a translator code formed of the digits designating the number block. All other working numbers in the number group are allocated individual translator codes and translations as before, each translator code comprising the block number followed by the digits of the number within the block. Hence all numbers in the block will be provisionally allocated a digital translation on receipt of the block number which digital translation is either confirmed because it still remains after a given number of further digits or is replaced by the digital translation corresponding to a number within the number block. This process may be applied to each number block needing more than one translation; for blocks needing 2, 3, 4 . . . digital translations it reduces the number of translator codes required to less than one half, two-thirds, four fifths . . . and is clearly of greater value the lower the number of groups. The process of number block translations which may be substituted by a later translation can be extended from first and second to third and so on translations made serially as described as the size of the number blocks diminishes, and the total number of translator codes and translations continuously diminishes. In the example being taken, fewer than fifty translator codes and translations might suffice for the 100 or thereabouts working codes in the number block of 1000 numbers all beginning with P1.

c. *Start sending signal.*—The one complication added by serial translation is that a digital translation must include an information digit to indicate if the translation is a final one or may be substituted by a further translation, and if the latter one, how many further incoming digits must be received before the translation may become effective. The information digit may conveniently be a "start sending" digit, the register being arranged so that it will not start using the translation until the "start sending" digit occupies in the register cycle the periods $p196$ to $p200$. The "start sending" digit by the position in which it is placed by the translator in the register cycle will then withhold action on the translation by the register until a further number of incoming digits have been received or the translation replaced by a further translation.

10. *Exchange number translations.*—The compilation of the translator codes including the feature of serial translations has been illustrated by examples using exchange codes. The exchange numbers must also be translated. Although the principles are the same, the application is slightly different. The number of translator codes is much less in relation to the total number of exchange numbers chiefly because spare numbers are identified and signalled by the exchange switches and do not need to be identified by the translator. The translator codes need therefore only identify that the call is a local one which means in general translator codes for only a small number of first or first and second digit numbers.

a. *Call diversion.*—The serial translations feature of the present invention facilitates certain special services. A call to a particular subscriber's line having been identified as a local call by a first translation can be picked out by a second translation and given special service such as diversion to an operator if the line is on interception or to another number on the same or another exchange if the called subscriber is absent from home and still wishes to receive incoming calls on another number.

b. *Parallel cycle division.*—The description of the features of the invention so far concerns the compilation of a single pair of translator code and translation cycles corresponding to one class of service. The cycle when compiled may take too long to complete within the time between recordings of successive incoming digits. It must then be divided into two or more smaller cycles, as shown in Fig. 5 the periods of which are within the specified time, the cycles being operated in parallel, which presents no difficulty as the cycles cannot mutually interfere.

c. *Class of service selection.*—For several classes of service, code and translation cycles may be provided for each and the appropriate pair selected for each individual call. Economies can, however, be effected by arranging for code cycles to serve more than one translation cycle, the translation cycle for any particular call being selected by means controlled by the class of service signal. If two sets of code and translation cycles have identical code cycles, the serving of the two translation cycles by the one code cycle is without difficulty. Although these conditions may apply over considerable portions of the cycles, it is unusual for them to apply over the whole cycles. Difficulties arise in arranging for two translation cycles which have different code cycles to use the same code cycle. Description of the means of surmounting these difficulties will be deferred until further details of the apparatus for carrying out the invention have been described.

11. *Relations between pulse circulator and translator.*—Referring again to Fig. 5, it has been described how translator code cycles of pulses are generated and applied to leads T11 and T21, and translation cycles of pulses to leads T12, T13, T22 and T23. Two sets of cycles are provided because the period of a single cycle would be greater than the minimum interval between the recording of sucessive incoming digits. Each set comprises a code cycle common to two translation cycles each corresponding to a different class of service, for example ordinary subscribers and subscribers barred long distance calls. In practice, one, two, or more than two sets of cycles may be needed at one exchange and different sets may contain different numbers of cycles. In Fig. 5 the translator cycles of pulses are shown as common to a number of registers of which one is shown in Fig. 4 and the left hand side of Fig. 5. The translator leads T12 and T13 are connected respectively to switching devices S151 and S152 shown as make contacts for the sake of illustration but preferably made up of electronic switching elements. Devices S151 and S152 are joined over a common lead S12 to the device U1 which again is shown as a make contact solely for the purpose of illustrating the invention. Devices S151 and S152 may be operated over lead S11 or S13 respectively in response to class of service signals. Thus a signal on lead S11 causes devices U1 to be connected to translation lead T12 and one on lead S13 causes device U1 to be connected to translation lead T13. More devices such as S151 may be connected to lead S12 and in this manner the translation cycle for any call may be selected by the class of service signal. The device U1, though preferably electronic, is shown as comprising two make contacts one of which when U1 is operated, connects the lead S12 to the input of the delay line 2 in Fig. 4 over lead 141 and the other of which connects the lead U0 to the device 9 in Fig. 4 over lead 91. The translation cycle leads T22, T23 are connected respectively to switching devices S251 and S252 which are in turn connected to a switching device U2 in a similar manner to the connections described for leads T12, T13 and devices S151, S152 and U1 respectively, so that either T22 or T32 can be connected to lead 141, and U0 to lead 91 by the operation of devices S251, S252 and U2.

The input lead 81 to the supersonic delay line 2 is connected over lead 142 to the switching devices CP1 and CP2 Fig. 5 to which are respectively also connected the translator code leads T11 and T21. The devices CP1 and CP2 each have the action that no signal is transmitted over the lead CP11 or CP21 if the delay line 2 input signal is different from the translator code signal. A source of pulses occurring at the register time pulse period P60 is connected over lead P6 to both devices U1 and U2 which may comprise trigger circuits. An impulse over lead P6 operates the devices U1 and U2 and connects the leads S12 and S22 to the lead 141 and the lead U0 to the lead 901. During the register time pulse periods $p60$ to $p100$ the first appearance of the incoming digits recorded in the register will be communicated to the devices CP1 and CP2 and a translator code from each of the leads T11 and T21 will be communicated to the devices CP1 and CP2 respectively. If the register pulses do not coincide with either of the translator codes, both devices U1 and U2 will be released before the expiring of the pulse period $p100$. During the comparison time the translator translation cycles are blank and no action on the register can take place. When, however, a translator code agrees with the digits recorded in the register one of the devices such as U1, or U2, say U1, will still be operated at cycle division $p100$ and will remain operated at least until the following cycle division $p60$ owing to the absence of any signal on lead 142 during the period stated. This is due firstly to the fact that no digits are stored in cycle divisions $p100$ to $p120$ at the time a translation is sought and secondly to the operation of devices 9 in the following manner. While any one of the devices U1, U2, etc. remains operated lead 901 is connected to lead U0 and a signal on lead U0 is communicated to device 90. Device 90 is also joined by a lead 902 to a pulse source P30 from which pulses occupying cycle divisions $p120$ to $p60$ are communicated. Device 90 is arranged so that pulses on lead P30 are only communicated over lead 91 to device 9 in Fig. 4 if a signal is occurring on lead 901. Device 9 is adapted normally to allow K1 pulses over lead 43 to pass to device 4 to gate circulating impulses received over lead 42 into device 1 and thence into the delay line storage system but device 9 is prevented from passing the K1 pulses when a signal is applied to lead 91 to operate device 9. Hence, when device 9 is operated the circulating path of the delay line storage system is in effect broken by the absence of K1 pulses in device 4 preventing pulses in the cycle divisions $p120$ to $p60$ passing into the delay line storage system. All such pulses are therefore lost and erased from the system. Also during the operated time of device U1, the impulses of a digital translation will be communicated from either lead T12 or T13 whichever is selected by one of the devices S151 or S152 over device U1 and lead 141 to the input of delay line 2 and are thus injected into the circulating system and will continue to circulate as previously described.

One of the advantages of recording in the circulating system two appearances of the incoming digits is now apparent. The comparison of a single appearance with a translator code and the substitution of a digital translation in the cycle divisions previously occupied by the incoming digits leads to more complicated arrangements than those described. It is most easily accomplished by recording the digital translation in the pulse periods beginning with $p1$, thus leaving the shift operations which would automatically follow to advance the digital translation into the desired position. This procedure is undesirable because of the high switching speed required of the devices U1 and U2 which would in certain circumstances have to release in the time between pulse periods $p200$ and $p1$. It is also undesirable because the record of the incoming digits so far received would be lost. In a system embodying the invention, in the event of the register failing to set up a connection on the first attempt, a second attempt may be made. In this event, the incoming digits in the second appearance are read out into an apparatus which retransmits them to the register as if they were incoming digits by which means the operations of the register in setting up the call can be repeated.

12. *Utilization of registered translations.*—Description has been given of the recording of incoming digits, and their translation according to the route, rate and special features of the calls which they represent. It remains to describe the utilisation of the translation which comprises reading the digits of the translation in the order in which they are recorded in the register cycle. Each digit occupies a group of five pulse periods. It would be possible to provide apparatus which would select and ascertain the number recorded in a first group of five cycle divisions, for example, $p131$ to $p135$ if the number of digits in the translation could not exceed 14, then select and ascertain the number recorded in the next group of five cycle divisions and so on. Apparatus of this kind is relatively complicated and is further complicated by the fact that the location of a translation digit in the register cycle is not in general fixed. Its location is dependent on the number of incoming digits which have been received since the translation operation, the recording of each such digit operating the shift circuit to advance all recorded digits five pulse periods in the register cycle. The system embodying the invention includes a simpler arrangement according to which, when it is required to ascertain the digits of translation, digit ascertaining means are connected to the circulating system at a suitable time in the register cycle, for example $p120$, this means being inoperative until the cycle has progressed to a point where the digit is received by the digit ascertaining means which records the digit and erases it from the circulating system. The actual location of the digit in the register cycle after division $p120$ is thus of no consequence. At each operation of the digit recording means the first of the remaining digits in the translation is ascertained and because each digit is erased as it is ascertained, successive operation of the digit ascertaining means reads the successive digits of the translation in order. The digit ascertaining means is indicated in Fig. 4.

a. *Preparation for digit extraction.*—Referring again to Fig. 4, device 201 is connected over lead 2011 to the delay line input lead 81 and to a pulse lead P7 over lead 2012. The pulses P7 comprise a combination of pulses in the register cycle divisions $p196$ to $p200$, the combination corresponding to the information digit which indicates that the setting up of the connection may commence. This information digit is stored in the circulating system as part of the translation and when it is advanced by the shift operation so that it occupies the cycle divisions $p196$ to $p200$ the device 201 will receive during these periods identical pulses over leads 2012 and 2011. When this occurs device 201 causes device 202 to operate by a signal on wire 2013. Device 202 which may comprise a trigger, remains operated until released over lead 161, for example, when the register is released. When operated, device 202 signals over lead 162 to a device 601 which will be described later. Device 601 is always generating one of two signals which will be called start and stop and these signals are connected to lead 6011 and thence to device 602 when device 601 is signalled over lead 162. At the point of operation being described a start signal is transmitted over lead 6011 which, being applied to device 602, causes a signal to appear on lead 6021 which is connected to device 301. Device 602 also passes the signal from device 601 over lead 6022 to the devices 501, 502 . . . 505 to prepare them for operation in a manner to be described later.

*b. Timing of digit extraction cycle.*—Device 301 also has connected to it a source of impulses P8 connected over lead 3011. The source of impulses P8 comprises an impulse occurring say, at register cycle division $p120$ and impulses over lead 3011 coincident with a signal over lead 6021 cause device 301 to operate, the operation of device 301 causing device 8 to operate by an impulse over lead 3012. Device 8 which may comprise a trigger circuit is operated by an impulse over lead 3012 and is released by an impulse over either lead 83 connected to a pulse source P9 or lead 3031 connected to the device 303. When released the device 8 connects lead 14 to lead 81, and when operated connects lead 14 to lead 82 which is connected to the switching devices 401 to 405. The impulses originating from source P9 are coincident with the K2 impulse at device 1 which terminate cycle division $p200$. Device 8 is operated by P8 impulse at about cycle division $p125$, which is a blank part of the cycle. When operated it breaks the circulation loop and connects the device 1 to the lead 82, which is connected to the translation digit recording apparatus yet to be described. Any impulses which are emitted from device 1 when device 8 is operated are erased from the storage system and communicated to the translation digit recording apparatus. Device 8 remains operated at the latest until the end of cycle division $p200$ when it is released by a P9 impulse. If there are no digits in the circulation system between cycle divisions $p125$ and $p200$, device 8 will be operated during the intervals between these two divisions but without effect. If however there is at least one translation digit between the periods corresponding to these divisions, the first will be erased from the circulating system and communicated as timed impulses over lead 82 in the following manner.

*c. One digit extracted per cycle.*—When device 8 is operated the impulses appearing on lead 14 are applied to lead 82 and thence to the switching devices 401 to 405. Device 303 is also connected to lead 82 by a lead 3022 and is operated by the first impulse of a digit communicated over lead 82 from lead 14 when device 8 is operated. Also connected to device 303 is a pulse source P10 which is connected to the device 303 by lead 3032. The P10 impulses are communicated over lead 3031 to device 8 when device 303 is operated, device 303 comprising a timing element such that after the device is operated by an impulse on lead 3022 the device remains operated for a period exceeding 5 microseconds but preferably less than 50 microseconds. The pulse P10 comprises impulses which are coincident with those ones of the K2 impulses, at device 1, which terminate the cycle divisions $p5n$ where $n$ is all the integers from 1 to 40, that is, the pulse $p10$ marks the termination of the groups of five pulses which comprise the digits recorded in the pulse circulation system. A P10 impulse over lead 3031 releases device 8. Hence if there is a digit recorded in the cycle divisions $p125$ to $p200$ when device 8 is operated by an impulse over lead 3012, the first impulse of the first digit operates device 302 and a P10 impulse releases device 8 when the digit has been communicated over lead 82 and before the first impulse of the next digit will have commenced to be emitted from device 1. No further operation of device 8 can take place until the next cycle division time $p125$ and then only if in device 301 the impulses of pulse P8 are coincident with a signal on lead 6021. The control of this signal will be described later but the sequence of operation is such that each sequence removes one translation digit from the circulating system and communicates it in time impulse form over lead 82. The digit will then be communicated to device 601 in a manner to be described later, the device 601 then changing over the signal over lead 6011 from start to stop and in so doing causes the removal of the start signal from lead 6021 to prevent device 301 from re-operating to the next series of P8 pulses.

When the device 601 is ready to receive a further digit, it replaces the stop signal over lead 6011 by the start signal, whereupon the digit ascertaining operation is repeated to read the next translation digit provided that there is one in the cycle division $p125$ to $p200$. By these means the translation digits are read out by the register one by one. If an incoming digit which is re-transmitted as a translation digit has not been received by the time the digit ascertaining apparatus is ready to read it, the apparatus is inoperative until the digit has been recorded and shifted into the cycle divisions $p196$ to $p200$.

*d. Recasting extracted digit before next digit extracted.*—Each of the devices 401 to 405, already stated to be connected to lead 82, has connected to it a pulse source P11 to P15 and a switching device 501 to 505 respectively. Each device 401 to 405 operates to emit an impulse over the lead, 4011 to 4051, which connects it to device 501 to 505 respectively, when an impulse over lead 82 coincides with an impulse from the pulse source connected to it. Source P11 comprises pulses at the register time of cycle division $p5n+1$ where $n$ is all the integers from 1 to 40. Similarly P12 to P15 comprise pulses at the cycle times $p5n+2$, to $p5n+5$ respectively. Hence the impulses of a digit communicated over lead 82 are distributed in order to the five devices 501 to 505 which may comprise trigger circuits and which are operated by impulses over the leads 4011 to 4051 respectively. The devices 501 to 505 are thus operated in combination corresponding to the digit received and communicate their condition to the device 601 over the leads 5011 to 5051 respectively. Device 601 then replaces the start signal over lead 6011 by a stop signal which resets the devices 501 to 505 over lead 6022 and prevents their re-operation until the stop signal is replaced by a start signal. Device 601 then communicates the digit over the register output lead OUT in the form demanded by the exchange switching system in use. If the exchange switching system is the Strowger type, device 601 may, for example, send out a train of impulses corresponding in number to the digit if it designates a number and then apply first the stop and then the start signal to lead 6011 to extract the next digit from the register circulating system, or alternately if the digit is an information digit, device 601 will take the appropriate action, for example release the register. The devices 501 to 505 are each connected to the lead 6011 over lead 6022 and device 602 and are released, if operated by a stop signal over that lead.

In carrying the invention into effect the various switching devices described are preferably comprised of electronic apparatus for example valves and rectifiers. The relay contacts and electro-mechanical distributors shown in the figures are, as already stated, intended to illustrate the action of the devices.

13. *Other considerations.*—Returning now to the translator code and translation cycles, it is apparent that if the code cycles are not switched by the class of service signals, the translator code cycles are common to the corresponding translation cycles for all classes of service. If a code is effective in bringing about a translation operation, the second appearance of the incoming digits or a previously recorded digital translation is erased from the circulating system. The problem then arises with codes common to more than one translation cycle, that a code for which there is no translation in one translation cycle, will by an unwanted translation operation, remove important information from the register number storage system. A first solution to this problem is to provide a digital translation for the unwanted code, the digital translation comprising digits identical with those removed by the translation operation which is thereby rendered ineffective. A second solution is to make use of the features of the apparatus in order to derive for one class of service translator codes which cannot be produced for any other class of service. This may be accomplished by providing in a translation cycle for one class of service and corresponding to a code common to more than one class of service a digital translation which contains a digit in the register cycle divisions $p1$ to $p5$. When transferred into a register circulating system, this translation will immediately bring about a shift operation which advances the first appearance of the incoming digits by five cycle divisions. Further incoming digits will therefore be recorded with a blank digit separating them from the previously recorded digit or digits, which provides a series of translator codes different from the translator codes corresponding to any other class of service. In effect by this means code cycles which are not common to more than one translation cycle can be produced, and economies can be effected in those exchanges where more than one set of code and translation cycles is necessary by compiling the code cycles in such a manner that a minimum number of translation cycles is required.

Information digits have been illustrated in the description by a digit which, by its position in the translation, indicates when the register may commence setting up the connection and by a digit which, by its position in the translation, indicates when the register has finished setting up the connection and may release. Two different means of recognising the information digits have been described. The first mentioned digit is recognised while still in timed circulating pulse form at the time when it is required to be effective by device 201 which compares the circulating pulses with the pulses from source P7. At the time when it is required to be effective, the second mentioned digit is recognised by the device 601 when the digit is received into the digit ascertaining apparatus. Digits corresponding to other information may be included in the translations and recognised by one or other of the two methods described. For example, a first number of the translation digits may be required to be transmitted out of the register over lead OUT as Strowger pulses and the following digits to be transmitted as coded V. F. pulses. An information digit located in the translation between the first number of digits and the remaining digits can be arranged to cause the device 601 to change from one method of transmitting numbers to the other. The invention provides great flexibility in the number and utilisation of information digits.

It will happen that codes longer than necessary will be received into the register at times e. g. P2ABCDEN for P1CDEN may be relatively common and this can arise due to two main causes. Firstly, if a subscriber dials P1CDEN when he could have reached the same number of dialling N only, or P2ABCDEN when P1CDEN would have sufficed, he can either be given the connection as if he dialled correctly, in which case he may continue in ignorance unnecessarily to dial long numbers; or he can be routed to an operator who will inform him of his mistake, but he must of course dial again. The second cause of unnecessarily long codes is immediate alternative route facilities. The translator preferably supplies a single digital translation suitable for either the direct or the immediate alternative route. If, for example, N would suffice for the direct route but P1CDEN is essential for the alternative, P1CDEN would be chosen and the direct route would have to take it. This second cause compels register translators to accept unnecessarily long codes. The treatment of subscribers dialling the same codes can then be whatever is desired.

The only problem of the too long code is cost. There may be 1 to 8 N codes and translations and perhaps several hundred P1CDE, all of which must be duplicated in the translator if P1CDEN (P1CDE equal to the local exchange code) and P2ABCDEN for each of the P1CDEN calls is to be admitted. On the other hand, if the P1CDE of the local exchange and P2ABC of all the P1CDE codes could be made to translate to what would have been on the delay line storage system if the correct number had been dialled, only some forty extra codes would be needed. This can be accomplished by translator code and translation cycles 400 microsecs. long i. e. twice the normal length, together with an erase signal occupying a full translator cycle. The erase signal will take out everything recorded up to that point. The digital translation will comprise just what would have been in the storage system at that point. For example for a P1CDEN code, there may be corresponding to P1 a translation for N. U. tone and a second translation corresponding to P1CDE. If P2ABCDEN is dialled, translation occurs after P2ABC and comprises P1C in the first appearance and the N. U. translation digits in the second appearance of the incoming digits. If there is a translation for the P1C this can be recorded instead of the N. U. tone translation.

If subscribers are connected when too long codes are dialled, they can share the translations with the junction. If treated differently, two translation cycles will be needed for the code cycle and selected by the class of service signal in the usual way.

D. *Detailed description (Figs. 9–15)*.—Reference will now be made to Figs. 9 to 15 inclusive which, as previously stated, should be considered as assembled together in accordance with the key diagram Figure 16 and together illustrate a system embodying the invention.

Figure 11:
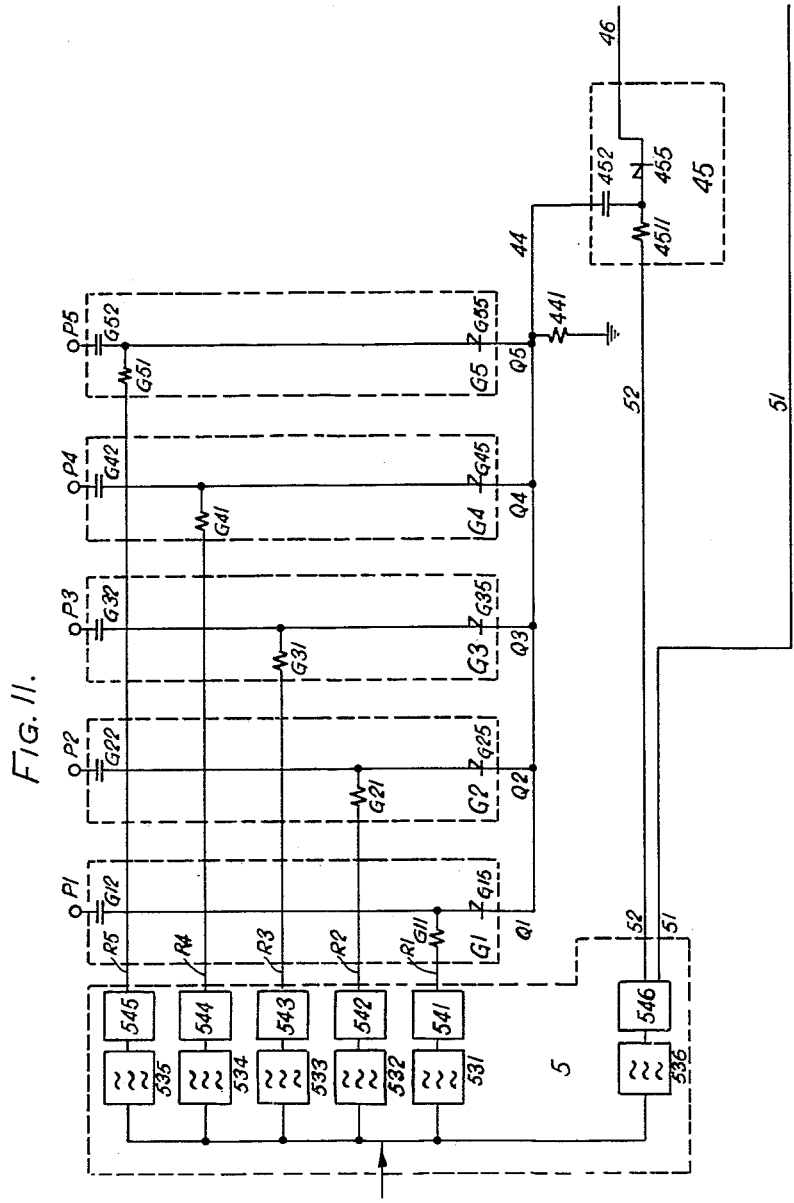

1. *Registering and shifting.*—a. *Recasting data for pulse circulation storage (Fig. 11)*.—For the purpose of explanation, it will be assumed that information may be fed to the register in the form of a number of tones or alternating current frequencies impressed on the "in" wire, although it will be understood that the application of the invention is not restricted to this method of signalling. The "in" wire, Fig. 11 is extended to the devices 531, 532, 533, 534, 535, which are band pass filters each transmitting one frequency and one only as prearranged. Consider the device 531. When that frequency which it is adjusted to transmit is impressed on the "in" wire, that frequency is passed by it to the device 541 which has an output wire R1. Device 541 is arranged so that wire R1 is at a negative potential when 541 is not excited, but is given a positive potential when 541 is excited. Wire R1 is connected to the device G1 which will be referred to as a gate. When R1 is at negative potential the rectifier G15 is biassed in the non-conducting direction and is of high impedance. When R1 becomes positive current flows from it through the resistor G11, rectifier G15, wires Q1 and 44 and resistance 441 to earth, since G15 is now biassed in its conducting direction and is of low impedance. The gate is now open to positive going pulses on the pulse lead P1 in cycle divisions $p1$ and 101 in register time and these pulses pass onto wire 44 through capacitor G12 and rectifier G15. G2, G3, G4, G5 are similar gates having on leads P2, P3, P4, P5 positive going pulses in cycle divisions P2 and 102, P3 and 103, $p4$ and 104 and $p5$ and 105 respectively. Thus any selection of the pulse leads P1, P2, P3, P4, P5, can be connected to wire 44 according to the frequencies impressed on the "in" wire, and the corresponding selection of pulses in cycle divisions $p1$ and 101, $p2$ and 102, $p3$ and 103, $p4$ and 104, $p5$ and 105, is connected to the device 45 which is also a gate controlled by the potential on the wire 52 in the same way as G1 is controlled by the potential on wire R1. Like gates G1, G2 etc., 45 is normally closed to pulses since the rectifier 455 is biassed in the high impedance direction.

b. *Record and shift inhibiting signals.*—In addition to any number out of the five frequencies corresponding to five pulse inputs P1 . . . P5, which are applied to the "in" wire, another frequency corresponding to the instruction "record" may also be applied. This frequency is transmitted by the filter 536 and excites device 546, which then raises the potential of wire 52 from negative to positive. The rectifier 455 is thus caused to conduct, so that any pulses appearing on wire 44 can now pass to wire 46 by which they are fed into the storage system. The device 546 also has connected to it the wire 51, whose potential is normally negative to permit operation of the pulse shifting means. On excitation of device 546 the potential of wire 51 is made positive slightly before that of wire 52 is changed, and is returned to negative slightly after that of wire 52. It will be appreciated that the excitation of device 546 may be effected by other means than those described.

*c. Digit pulse entering means 1 (Fig. 12).*—The positive going input pulses on wire 46 enter the device 1 of Fig 12 containing a pentode valve V1. Under normal conditions (that is, except when digit pulses are being extracted as hereinafter described) a positive potential E1 is applied to its screen grid by the lead 86, while the suppressor grid is held at cathode potential by current flowing from the positive supply potential E5 through resistor 114, rectifier 154, and resistor 113 to the negative potential supply E7. Cathode potential is prevented from falling below earth by rectifier 155 but may rise above it due to cathode current flowing in resistor 113, giving control over the cathode current taken.

A succession of short (say 0.2 microsec.) negative going pulses, occurring at the end of each register time cycle division and called K2 pulses (cf. Fig. 1b) are applied to wire 14 by way of pulse lead P24, capacitor 121, and rectifier 152. The effect of the K2 pulses on the potential of wire 14 is limited by rectifiers 152, 153, and 457, which will conduct when the junction of 121 and 112 is brought to a lower potential than E6 and that junction will then acquire a positive charge on capacitor 121 which will hold rectifiers 152 well cut off. At the same time capacitor 122 is charged negatively to E6 and will retain that charge substantially in the interval between K2 pulses, since rectifier 152 is cut off and rectifiers 151 and 153 are both connected to potential E6. The grid of valve V1 is thus kept below the cut off potential by capacitor 122 and wire 14.

Consider a positive going pulse of length 0.8 microsec. and in register time phase applied to wire 14 from wire 46 via rectifier 151. The small capacitor 122 is charged up and valve V1 conducts for the duration of the pulse, current is drawn through the winding 1431 of pulse transformer 143 and a positive going pulse is produced at the secondary terminal 14321 of the transformer. For convenience in the physical arrangement of the equipment, this transformer is designed to feed pulses into the coaxial cable 81, which may be run to a considerable distance and there terminated suitably, while pulses may be withdrawn by high impedance tappings where required, as at the capacitor 221, where such pulses are connected to the grid of valve V2. The grid of this valve is normally biassed below cutoff by the chain composed of the rectifier 251, and resistors 211 and 212, which is connected to the negative supply potential E7.

*d. Transfer of digit pulses to delay line 2 (Fig. 12).*— The valve V2 controls a gate formed by the two transformers 241 and 242 with their associated components, by means of which pulses of alternating current of about 11 mc./s. frequency drawn from the source 27 are produced for application to the supersonic delay line. In the arrangement shown the two transformers are designed as a band pass filter, the capacitors 224, 222 with 223, 225 and 226 representing the appropriate shunt capacities. These are in part or entirely supplied by the self capacities of the transformer windings and other components. Capacitor 226 for example consists of the self-capacity of winding 2422 and the capacity of the grid of valve V3 to earth, this arrangement giving the highest possible output impedance for the filter, which is matched by resistor 217, and hence the highest possible output to the grid of valve V3.

Consider the gate in the shut condition, when valve V2 takes no anode current. E1 is a high positive potential source and E3 a source of positive potential at, say 100 volts lower than E1. Current flows through resistors 213 and 214, then through the paths 215 and 255, 216 and 256 in parallel to the winding 2421 and thence via terminal 24212 to the source E3. The potential drop across resistor 214 and the parallel combination of 215 and 255 with 216 and 256 acts across the rectifiers 253, 254 in such a direction that they offer a high impedance. There is thus a high impedance in the connections between the transformer terminals 24123 and 24213, 24121 and 24211, while rectifiers 255 and 256 are of low impedance. The resistors 215 and 216 are so chosen that when in series with the forward or conducting impedances of rectifiers 255 and 256 they will match the characteristic impedance across terminals 24213 and 24211.

*e. The supersonic delay line (Fig. 12).*—Thus the alternating voltage applied to the transformer primary 2411 and developed across terminals 24211 and 24213 is greatly attenuated, while transformer 242 is correctly matched looking towards 241.

When V2 is caused to conduct, anode current flowing in resistor 213 causes the potential at terminal 24122 to fall rapidly to E3, when rectifiers 253 and 254 conduct, limiting that potential to E3. The anode of valve V2 however reaches a lower potential due to current flow in resistor 214, this potential difference acts across the combination of 215 with 255, 216 with 256, in such a direction as to cut off the rectifiers 255, 256 whose impedance is then high. The series impedance of rectifiers 253 and 254 being low, while the shunt impedance due to rectifiers 255 and 256 is high, the attenuation between the transformers 241 and 242 is low and alternating voltage may be transmitted to the grid of valve V3. Thus when V2 is caused to conduct by a positive pulse applied to its grid a corresponding A. C. pulse drawn from the source 27 is transmitted to the grid of V3.

The valve V3 serves to amplify these A. C. pulses and drive the supersonic delay line. The current in the valve is stabilised by the resistor 218 which is returned to the negative potential E7 and is bypassed for alternating current by the capacitor 2212 to earth. The transformer 243 is again designed as a band-pass filter, the secondary winding 2432 with capacitor 227 matching the characteristic impedance of the coaxial cable 22. On the primary side the capacitor 2213 consists of the anode-earth capacity of valve V3 and the self-capacitance of winding 2431 and this enables the characteristic impedance at this point, and thus the matching resistor 219 and the gain of the amplifier, to be made as high as possible.

From the coaxial cable 22 the pulses are fed to the supersonic delay line 26 by means of the transformers 244, 245, and the piezo-electric crystal 261. By this means the A. C. electric pulses in the cable are converted to bursts of supersonic mechanical vibrations which are propagated along the mercury in the line and arrive at the receiving piezo electric crystal 262, where they are reconverted to electric pulses, after a time depending among other things on the length of the line between the crystals. The delay line is arranged to produce a delay of 194.7 microsecs. nominally, i. e., 194.7 cycle divisions.

The piezo-electric crystal is a very inefficient transformer of electrical to mechanical energy and presents to its electrical input an impedance which is for practical purposes entirely capacitive. The delay line is conveniently driven by some form of transformer, a suitable arrangement is a tuned transformer which acts as a bandpass filter section. The input capacity of the delay line forms the shunt capacity of the final half-section, which must be terminated by the appropriate resistance. The characteristic impedance of the filter at this point is then determined by the input capacity of the line. However, if another filter section having the same characteristic impedance is added, the delay line input capacity may be regarded as two capacities in parallel, each associated with one of the filter sections. The shunt capacity at the ends of the filter sections is thus halved and their characteristic impedance doubled, increasing the voltage applied to the delay line input.

In the arrangement described the capacitor 22112 represents the capacity of the delay line input crystal 261 and its mountings, together with that of the transformer windings 2442 and 2451. Transformer 245 and capacitor 229, together with half the capacity of 22112, form the additional filter section described and resistor 2110 terminates the filter.

The arrangements at the output piezo-electric crystal 262, connecting it to the coaxial cable 21 are similar.

*f. Restoration of delayed digit pulses 3 (Fig. 13).*—Since the supersonic delay line 26 has an attenuation of the order of 60 to 70 db the cable 21 is taken to a suitable high-gain amplifier 36 in Fig. 13. The amplified A. C. pulses are fed to the band-pass transformer 342, the secondary winding 3422 of which is centre-tapped. Capacitors 324, 325 represent the appropriate shunt capacity and resistor 311 the terminating resistance of the filter. Rectifiers 351, 352 provide full wave rectification of the A. C. pulses. Inductor 33 and capacitor 326, together with capacitor 621, which represents the input capacity of valve V4 and the capacity of the wires 31, form a low pass filter terminated by resistor 611. The build up time of this filter is small compared with the length of the pulses.

Pentode valve V4 acts as a pulse amplifier, being normally fully conducting but being cut off by negative pulses appearing at its grid via wires 31 from the rectifier and filter described above. Resistor 612 is of the order of 30,000 ohms so that the anode potential of V4 "bottoms" to about 20 volts positive from its cathode which is returned to a negative potential E7. For illustration suppose that E7 is —50 volts, the anode will then normally stand at about —30 volts.

*g. Pulse shifting switch 6 (Fig. 13).*—The rectifiers 651, 652, together with transformer 54 form a switch whereby pulses produced at the anode of valve V4 may be diverted onto leads 61 or 62, depending on the potential of wire 1021. Consider wire 62 which is connected via rectifier 754 to the grid of V5 and for illustration, suppose that E6 is —6 volts, a convenient value to keep valve V5 cut off. Then current will flow through rectifiers 755 and 756 and resistor 715 from E6 to E7 which it has been assumed is —50 volts and the potential of wire 62 will then be held to about —6 volts.

In what will be called the "normal" condition, the potential of wire 1021 will be, say, 30 volts positive, so that rectifier 652 which is biassed by a voltage derived from Fig. 15 over wire 1021 will be cut off by about 60 volts while rectifier 651 will be cut off by 24 volts. Now suppose that an A. C. pulse emerges from the supersonic delay line, is amplified, rectified, and applied as a negative going pulse to the grid of valve V4. The anode potential will then rise to about —6 volts when rectifier 755 will cut off and current will flow from the positive E1 supply through resistor 612, rectifiers 651 and 756 and resistor 715 to the E7 supply. Resistor 715 is so chosen in relation to resistor 612 and the potentials E1 and E7 that the potential of wire 62 still does not rise above —6 volts. As the potential of wire 62 is limited as above to —6 volts and rectifier 651 is conducting, rectifier 652 is still biassed in the non-conducting direction by about 36 volts.

In what will be called the "shift" condition the potential of wire 1021 is made conveniently —20 volts. Initially rectifier 651 will be cut off, as before, by 24 volts but rectifier 652 by only 10 volts. On valve V4 being cut off its anode potential will rise above —20 volts when rectifier 652 will conduct and pass current through the winding 642 of the pulse transformer 64 and rectifier 651 remains cut off. Thus in this condition a pulse will be produced on wire 61 by pulse transformer 64.

*h. Retiming digit pulses in primary cycle path 7 (Fig. 13).*—Assuming that the "normal" condition obtains, and that a pulse 0.8 microsec. long in the register time of cycle division $p1$ was applied to valve V1 as already described, a pulse of current, ideally also 0.8 microsec. long will commence to flow in wire 62 after 194.7 microsecs. Applied to the pulse lead P23 is a succession of short (0.2 microsec.) pulses occurring at the start of each register time cycle division. These pulses are positive going, follow the K2 pulses described above but do not coincide with them, and are known as K1 pulses. The current pulse in wire 62 will be centred in time on the K1 pulse initiating register time cycle division $p196$ and will coincide effectively with it if it has been delayed by 194.7 plus or minus 0.3 microsec., so that a timing tolerance is obtained which allows for small changes of delay in the line due to temperature changes etc. The current pulse in wire 62 is compared with the K1 pulses, and in the event of effective coincidence a fresh pulse is generated which is located accurately in the pulse period following the K1 pulse concerned. Considering again a pulse of current flowing from wire 62 through rectifier 756 and resistance 715 to potential source E7, if now a K1 pulse of sufficient amplitude from pulse lead P23 is applied through capacitor 723 to rectifier 756, that rectifier will be cut off for the duration of the K1 pulse and the current from wire 62 will flow through rectifier 754 (cutting rectifier 755 off) into capacitor 721, charging it and raising the potential of the grid of V5 so that that valve conducts. Rectifier 753 will remain cut off, having a positive potential applied to it by capacitor 722 whose junction with resistor 713 is charged positively by the K2 pulse on pulse lead P22, due to the limiting effect of rectifiers 753, 754, 755. Capacitor 721 being charged and the current ceasing to flow into it at the end of the K1 pulse, rectifier 754 cuts off and the capacitor discharges so slowly that valve V5 remains conducting until the end of the pulse period, when the negative going K2 pulse again applied to rectifier 753 by pulse lead P22 and capacitor 722 discharges capacitor 721 and cuts the valve off. Current is thus drawn through the winding 742 of pulse transformer 74 and amplified pulses, positive—and negative—going respectively, are produced at terminals 7411 and 7412 of its centre tapped secondary winding. It will be remembered that these pulses will occupy cycle division $p196$. Resistor 712 serves to terminate the positive going half of this winding and the pulse is applied to the electric delay line which is terminated by resistor 711.

*i. Completing time cycle in primary path 7 (Fig. 13).*— The electric delay line 73 is arranged to produce a delay of 4.7 microsecs., so that the pulse referred to which enters it in cycle division $p196$ will emerge centred in time on the K1 pulse initiating division $p1$ and ready to be compared with it. As with the supersonic delay line 26 this allows a tolerance of plus or minus 0.3 microsec. on the delay produced by the line. The electric delay line has an attenuation of the order of 6 db and the valve V5 provides corresponding amplification, besides allowing for retiming the pulses.

*j. Timing reinjection of circulated pulses 4 (Fig. 12).*— From the output of the electric delay line, pulses pass through the rectifier 751 onto wire 42, by which they pass to the device 4, Fig. 12, where they are compared with K1 pulses which normally enter it by wire 41. In this device resistors 411 and 413 are approximately equal and are connected to the same negative potential E7. Current flows through them via the rectifiers 456 and 457, drawn from positive supply E5 through resistor 412 and from the source E6 through rectifier 457. Source E6 is at a negative potential sufficient to keep a valve non-conducting by the grid, say —6 volts. Wire 12 is thus held to the potential E6. The values of resistors 411 and 413 are so chosen in relation to the supply potentials and the value of resistor 412 that in this condition the current in either of them is rather greater than that taken by resistor 412. Now suppose that a positive going K1 pulse arrives via wire 41 and capacitor 422, rectifier 458 is then cut off. Correspondingly less current is taken by the rectifier 457 but it remains conducting as resistor 412 is unable to supply all the current drawn by resistor 411. The potential of wire 12 is thus unaltered at E6. Now if at the same time a positive pulse is applied by wire 42 and capacitor 421 to rectifier 456, cutting it off also, current from source E5 flows through resistor 412 onto wire 12, raising its potential and cutting off rectifier 457. The potential of wire 12 then rises as fast as permitted by its own capacity and the capacitor 122 charging through resistor 412 and falls again when either of the rectifiers 456, 458 is allowed to resume conduction. Thus a positive going pulse appears on wire 12 during the period in which positive pulses are applied to both rectifiers 456, 458. So when an 0.8 microsec. long pulse is applied to cut off rectifier 456 and one of the succession of K1 pulses cuts off rectifier 458 during the duration of that pulse, a positive going pulse coincident in time with the K1 pulse is produced on wire 12.

*k. Return of circulated digit pulses to pulse entering means 1 (Fig. 12).*—In the case of the pulse which has been followed through the system this will be, as explained above, the K1 pulse initiating register time cycle division $p1$. This positive going pulse passes rectifier 153, finds rectifier 152 cut off against it by the charge built up on capacitor 121 by the K2 pulses applied at P24 and operating as explained earlier in reference to the gating of pulses to V5 and cuts off rectifier 151 as it charges capacitor 122 and brings the grid of V1 up above cut-off potential. Valve V1 becomes conducting and remains so after the end of the positive pulse, as capacitor 122 discharges slowly (compared with the pulse period) through rectifiers 151, 152, 153, all of which are cut off and offer a high impedance. Valve V1 remains conducting throughout the cycle division $p1$ until the negative going K2 pulse at the end of that period discharges capacitor 122 through rectifier 152 and cuts V1 off again by its grid. The K2 pulses will charge capacitor 122 and wire 14 to a negative potential which is limited at potential E6 by rectifiers 153 and 457 conducting. Since wires 12 and 46 both stand normally at about E6 and rectifier 152 will be cut off wire 14 will remain at about E6 and V1 will remain cut off in the absence of further positive going pulses.

The circulation cycle has now been completed, a pulse put into the system by way of wire 46 in cycle division $p1$ in one cycle has been delayed, retimed, regenerated and put back via wire 12 in cycle division $p1$ in the next cycle, and the circulation can proceed indefinitely, the pulse arriving on wire 14 at cycle division $p1$ in each cycle.

*l. Erase gate 9 (Fig. 12).*—Circulation can be stopped by the "erase" gate, item 9, which acts by shutting off the K1 pulse from wire 41, after which no pulses can be produced on wire 12. An "erase" pulse lasting from cycle division $p120$ to division $p60$ in the next cycle is fed by coaxial cable 91 to the pulse transformer 94. A corresponding positive going pulse of greater amplitude than the K1 pulses on wire 43 is produced at the transformer terminal 9421. Rectifier 952 conducts and the junction of rectifier 951 and resistor 911 is driven positive. Rectifier 951 normally conducts, passing current through resistor 911 to the negative potential E7, but it is now biased non-conducting and the K1 pulse does not pass it. The potential of wire 41 is driven positive slowly, charging capacitor 422, but the charging current is too small to affect gate 4, being only a fraction of the normal current through rectifier 458. No further K1 pulses will occur on lead 41 since rectifier 951 will fail to conduct them by the time delayed pulses again occur on lead 42.

*m. Digit pulse shifting by switch 6 (Fig. 13).*—Thus it is possible to select, by means of tones of different prearranged frequencies sent into the device 5 on the "in" wire in Fig. 11 any or all of the pulses on pulse leads P1, P2, P3, P4, P5, which occur in register time cycle divisions $p1$ and 101, $p2$ and 102, $p3$ and 103, $p4$ and 104, $p5$ and 105 respectively, to insert them into the circulating system by application of the prearranged "record" signal, to circulate them for an indefinite period, and to expunge them if required by means of the "erase" pulse. Two blocks of cycle divisions are occupied in the circulation cycle, from divisions $p1$ to $p5$, and from $p101$ to $p105$. If now the switching device 6 Fig. 13 can be changed over for one cycle, so that during that cycle the circulating pulses pass along wires 61 and 42 directly from transformer 64 to the retiming gate 4, they will undergo a delay of only 194.7 microsecs. and will arrive at the grid of valve V1, after retiming in 4, in the blocks of cycle divisions $p196$ to $p200$ and $p96$ to $p100$ respectively. It may be said that they have been moved back in position, i. e. ahead in time, 5 cycle divisions in the cycle and another 5 pulses or any combination of them can now be inserted into the original positions $p1$ to $p5$ and $p101$ to $p105$ and by moving the whole collection back 5 cycle divisions another set can be inserted and so on.

Figure 13:
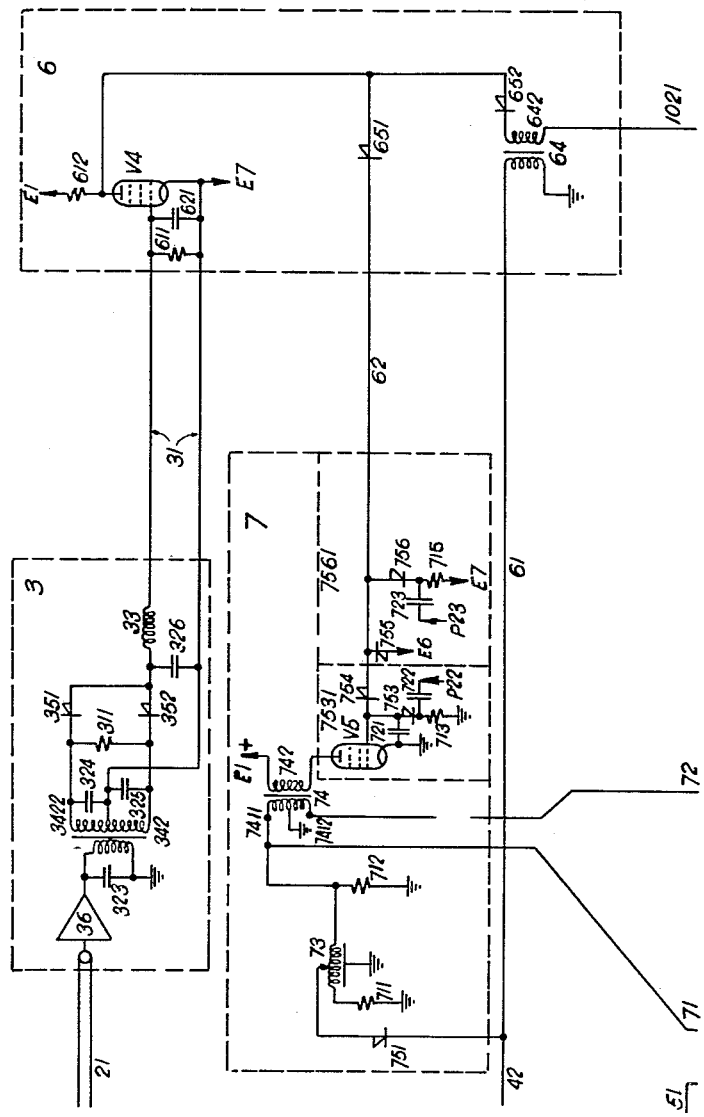
Figure 14:
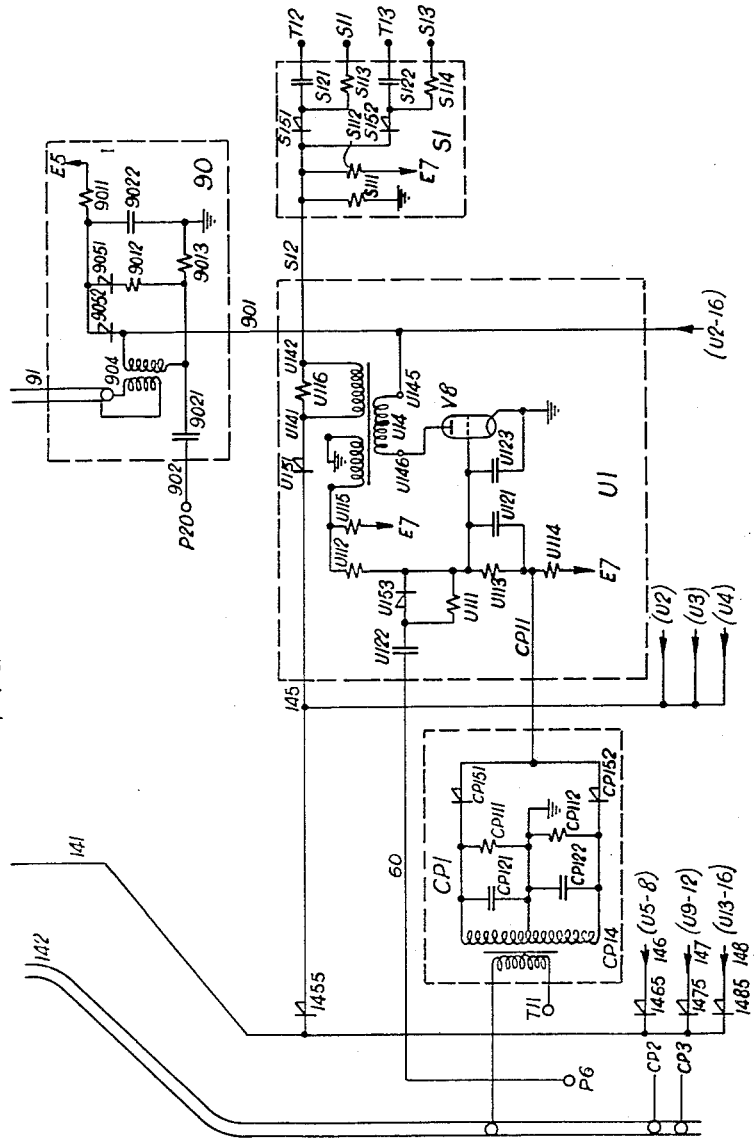

(1) *Activation by pulses on wire 71 in cycle division 196–200 for operation during next cycle divisions 120–110.*—It is arranged for convenience that any pulses appearing on wire 71, Fig. 13, during the register time cycle divisions $p196$ to 200 (these being the pulses which were inserted during the cycle divisions $p1$ to $p5$) shall in the absence of a positive potential on wire 51 prepare the shift device 102, Fig. 15, so that a pulse occurring in, say, the next cycle division $p120$ may operate the device, in a manner which will be described later, bringing down the potential of wire 1021 to say —20 volts, after which as described above pulses produced at the anode of valve V4, Fig. 13, are diverted from wire 62 to wire 61. At the same time a gate in the shift device is opened to allow a pulse in period $p110$–$120$ in the next cycle to reset the device and restore the full 200 microsecs. delay in the circulating system. The short delay path 61 has thus been switched into the circulation for approximately one cycle lasting from about cycle division $p120$ to division $p110$ in the next cycle, both in register time, these times for the changeover are convenient as it can be arranged that no pulses will ever be leaving the supersonic delay line in these periods.

The inhibiting action of a positive potential on wire 51 ensures that no attempt is made to shift the information in the system while pulses are actually being read into it, as in that case the system would rapidly fill itself with repetitions of those pulses.

*n. Summary of registering and shifting operation.*—The complete sequence of events is then as follows. Commencing with the circulating system empty, signals corresponding to one or more out of the five sets of cycle divisions $p1$ and $p101$, $p2$ and $p102$, $p3$ and $p103$, $p4$ and $p104$, $p5$ and $p105$, are applied to the "in" wire according to the code used, to represent a digit. The appropriate pulses then appear on wire 44, Fig. 11, in register time. The signal corresponding to the instruction "record" is also put on the "in" wire, for convenience assumed to be slightly later. The device 546 is excited and the potential of wire 51 changes, inhibiting the shift device in Fig. 15. Shortly later the potential of wire 52 in Fig. 11 rises, gate 45 opens, and the selected pulses flow by wires 46 and 14 to the grid of valve V1, entering the circulating system. Initially the succession of pulses from wire 46 restart the system at each cycle. Now the "record" signal is removed from the "in" wire, the potential of wire 52 falls, gate 45 shuts, and the circulation continues by virtue of the pulses gated by device 4, Fig. 12. It will be noted that at every cycle so far these have been pulses on wire 71, Figs. 13 and 15, in register time cycle divisions $p196$ to $p200$, but the shift has been inhibited by wire 51. The potential of wire 51 now falls after that of wire 52 and the shift operates over one cycle as described above. After this no pulses occur on wire 71 during cycle divisions $p196$ to $p200$ (register time) until another digit is inserted.

In order to ensure that the circulation system is not overfilled so that pulses appear in the periods reserved for shift switching and other operations, it is arranged that should any pulses appear on wire 72, Figs. 13 and 15, during register cycle divisions $p110$ to $p120$ inclusive the shift device shall be inhibited. The period $p110$ to $p120$ is chosen for convenience and economy in the number of repetitive pulse sources needed. The system can be filled until pulses appear, after shifting, in register cycle divisions $p121$ to $p125$ and $p21$ to $p26$. The pulses in register cycle divisions $p121$ to $p126$ will appear on wire 72 during register cycle divisions $p116$ to $p120$ in every cycle, and will prevent the shift device operating again. Another digit can still be inserted into the groups of cycle divisions $p1$ to $p5$ and $p101$ to $p105$ (register time) but no further shifting can occur and the total capacity of the system as described is 17 digits, each having two appearances.

Pulses may be inserted into the system at other points, such as the wire 42, such pulses would have to be about 0.4 cycle division in advance of the register times of their cycle divisions so that they can coincide in the comparison device 4 with the K1 pulse initiating those cycle divisions.

Figure 12:
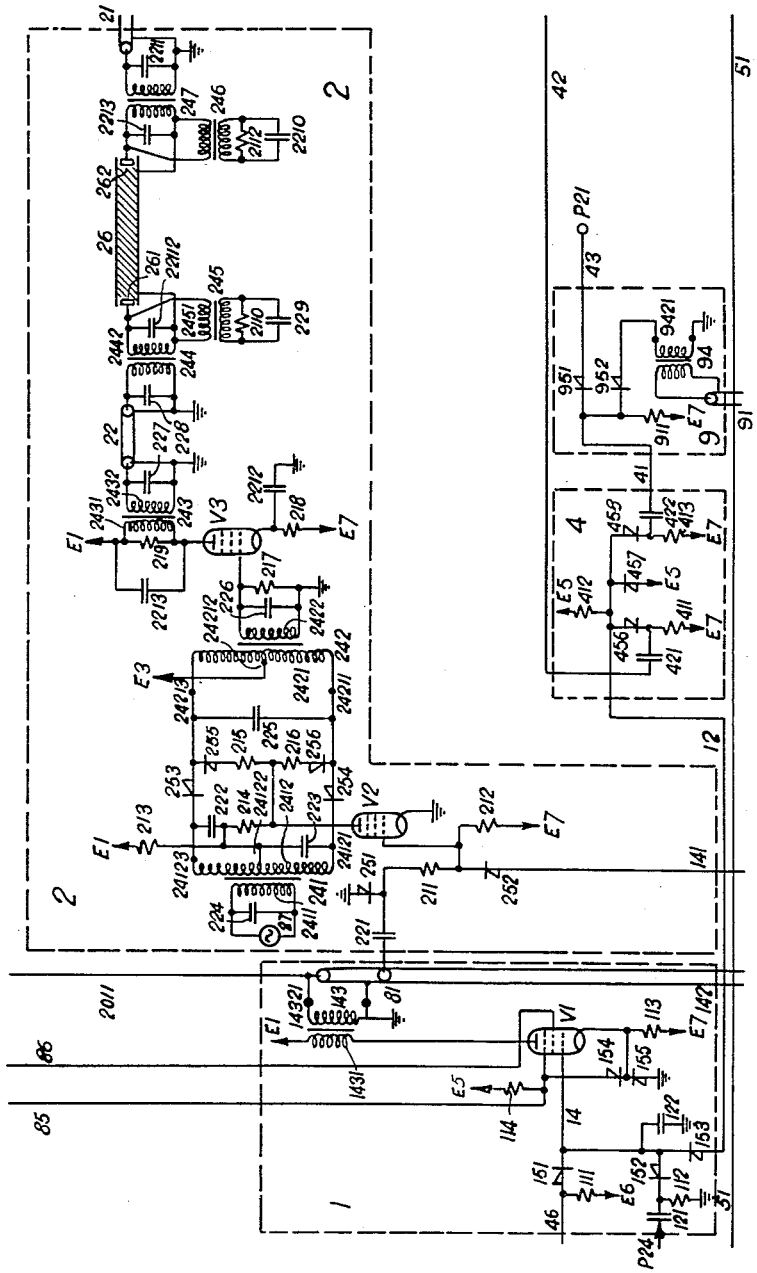

(2) *Extraction of stored digits.*—It is also necessary to provide means for extracting the stored information from the circulating system which may be done in the following manner. Wires 85 and 86, Figs. 9 and 12, are connected to the suppressor and screen grid respectively of the pentode valve V1. Wire 85 is normally held near the potential of the valves cathode by current flowing from the positive potential source E5 through resistor 114, rectifier 154, and resistor 113 to the negative potential source E7, but may be driven negative when rectifier 154 will be cut off. The wire 86 is taken through one winding of pulse transformer 842, Fig. 9, to a positive potential source E1.

Under normal conditions, with the suppressor at cathode potential, the current taken by the screen grid of the valve when it is allowed to conduct will be a small and predictable proportion of that taken by the anode, and the devices connected to wire 86 are arranged to ignore it. Now if the potential of the suppressor is made sufficiently negative by wire 85, no current will flow into the anode through transformer 143, but a much larger current will be taken by the screen grid through wire 86 and pulse transformer 842. Thus any pulses arriving on wire 14 under these conditions will be transmitted to the device 8 via wire 86 and will be wiped out of the circulating system.

(3) *Translation of digit entry.*—Translation digits enter the system as positive going pulses on wire 141, each pulse 0.8 cycle division long and in register time phase. The switching of the translation digits will be described later. The polarity of the pulses causes the isolating rectifier 252 to conduct. At the same time a short erase pulse is applied to the gate 9 by cable 91, cutting off the circulation as described above and erasing the stored digit translated, whose translator translation digit occupies its place in the cycle.

(4) *Shifter operating means (Fig. 15).*—The shift operation previously referred to will now be explained in more detail.

a. *Reading for shifting after digit recorded.*—The positive going circulating pulses at the secondary winding of transformer 74 in device 7 of Fig. 13 pass into the electrical delay line and also over lead 71 to one end of resistor 10012 in device 100 of Fig. 15. The other end of resistor 10012 does not change in potential in response to these circulating pulses unless they coincide with a pulse of P17, since, in the absence of a pulse of P17, rectifier 10052 conducts and prevents such change of potential. P17 is a positive going pulse occupying the register time of the cycle division $p196$ to $p200$. When the circulating pulses coincide with a pulse of P17, they are applied via capacitor 10021 across resistor 10013 to one end of the rectifier 10051. The other end of rectifier 10051 is connected via resistor 10011 to lead 51 which lead has impressed upon it either a positive or an earth or negative potential derived from device 5. If lead 51 is positive, the rectifier 10051 does not conduct and no pulses are conveyed to lead 1001. If, however, lead 51 is at earth potential or negative, rectifier 10051 conducts and conveys pulses to lead 1001. Thus, if pulses are circulating in the storage system at register times $p1$ to $p5$, that is pulses corresponding to cycle divisions $p196$ to $p200$ at the input of the 5 micro-seconds electrical delay line, indicating that there is a recorded digit to be shifted, and if the shift operation is not inhibited by a positive potential on lead 51, then positive pulses will be present on lead 1001.

A positive pulse applied to capacitor 10121 in device 101 causes rectifier 10152 to conduct and charge capacitor 10122 to a small positive potential. The normal condition of V16 is the non conducting condition, in which the cathode is held near to earth potential by rectifiers 10153 conducting and carrying the current of, for example 10 ma. which flows in resistor 10117 to the negative potential E7, for example 50 volts. The grid of V16 is biased to cut off by a negative potential obtained from the junction of the two resistors 10114 and 10115 of which 10114 is earthed via the secondary winding of transformer 10141, and resistor 10115 is taken to the negative potential E7. The anode of V16 is supplied from a low positive potential E5 sufficient for the valve to operate on the high impedance portion of its anode characteristic. The screen grid of V16 is supplied from the high positive potential E1 via a high resistor 10118 and is coupled via a large capacitance 10123 to the junction of resistor 10111 and rectifier 10151. When V16 is cut off a current flows from the positive potential E1 through resistor 10111, rectifier 10151, and resistor 10112, the resistors being chosen so that very little current flows in the primary of transformer 10141 to the positive potential E5 connected to one end of it. The potential across capacitor 10123 is equal to the difference between the potentials E1 and E5 and for practical purposes may be assumed to be constant during the short time of operation of the circuit.

A positive potential on capacitor 10122 causes V16 to conduct and to cut off rectifier 10153. V16 draws its cathode current via resistor 10117 the cathode current of V16 being controlled in a manner previously described at 10 ma. in this example. When V16 is conducting as described the majority of the screen grid current of 2.5 ma., in this example, flows via capacitor 10123 in the resistor 10111 bringing the potential of rectifier 10151 and the elements connected to it down to a value less than E5 and allowing current to flow in the primary winding of transformer 10141. The voltage developed across the secondary load resistor 10113 and applied to resistor 10114 is positive and holds V16 in its conducting condition. The positive excursion of the grid of V16 is limited to about 1 volt when rectifier 10154 conducts and current flows into resistor 10119.

b. *Effecting shifting at pulse interval 120.*— The suppressor grid of V16 is held at earth potential by resistors 10213 and 10214 but is supplied with a negative pulse P18 via the small capacitor 10222 and rectifier 10254. P18 occupies cycle division $p120$, at the register time of which it cut off the anode current of V16 so that the whole of V16 cathode current, when V16 is conducting, flows via the screen grid of V16.

The resistors 10212 and 10211 pass a small current, less than 1 ma. for example, from the high positive potential E1 through the rectifier 10253 to earth. These two resistors are chosen so that lead 1021 connected to their junction has a positive potential of, for example, 30 volts. When V16 is conducting with a screen grid current of, for example 2.5 ma., the potential of lead 1011 is lowered from E5, of, for example, 50 volts to 35 volts and rectifier 10251 does not conduct. When, at register time p120, the screen grid current increases to, for example, 10 ma., the rectifier 10251 conducts and carries the greater part of this increased current to lead 1021. Reactifier 10252 which is connected to a negative potential E20, of, for example, 20 volts, conducts and limits the negative excursion of lead 1021. The potential of lead 1021 thus changes from +30 volts to —20 volts a total change of 50 volts in this example. This 50 volt change of potential is carried to the suppressor grid of V16 via the large capacitance 10221 and the resistor 10213 and cuts off the rectifier 10254 and holds the suppressor grid at —50 volts in this example. Lead 1021 consequently remains at the potential P20 and diverts the register pulses from lead 62 in Fig. 13 to lead 61 via transformer 64, thus shortening the circulating path by 5 micro-seconds and causing the shift operation to occur.

*c. Concluding shifting at pulse interval 110.*—When lead 1021 in Fig. 15 is positive, it applies a positive potential via resistor 10215 to the junction of capacitor 10223 and rectifier 10255 and lead 1024 is at about earth potential. A negative pulse P19 at the register time of cycle division P110 is applied via lead 1023 to capacitor 10223 but does not in these circumstances cause rectifier 10255 to conduct and does not therefore reach lead 1024. When lead 1021 is negative, the rectifier 10255 conducts to a small current through resistor 10215 and admits the pulse P19 to lead 1024. This pulse is applied via capacitor 10124 and rectifier 10154 to charge capacitor 10122 to a negative potential cutting off V16. Capacitor 10122 maintains its negative potential until after transformer 10141 is no longer energised and the normal negative bias is restored from the resistors 10114 and 10115.

*d. Inhibiting shifting when register full.*—In the event of the negative going circulating pulses on lead 72 coinciding with the negative pulse P16, such coincident negative pulses are emitted from device 103 on lead 1031. P16 is required to have the register time of cycle divisions p116 to p120 inclusive, but not to include cycle divisions p121 to p105. It is convenient to use cycle divisions p110 to p120 for P16, and P16 and P19 may then be the same pulse. Pulses on lead 72 occurring at times other than during cycle divisions p110 to p120 are developed across resistor 10311 and prevented from reaching lead 1031 by rectifier 10351 conducting. Negative pulses on the lead 1031 indicate that the storage system is regarded as being full and cut off V16 before the occurrence of pulses P18, thus inhibiting the shift operation.

(5) *Translating (Fig. 14).*—*a. Code digit comparer CP1.*—When one or more incoming digits have been recorded and are circulating within the storage system they will appear on lead 142 at the same time as they appear at the input end of the supersonic delay line. The digits on lead 142 are applied to the devices CP1, CP2, CP3, etc. of Fig. 14 within which they are compared with the digits appearing in the translator code cycles T11, T21, T31. In device CP1, the two sets of digits one set in the storage system and the other set in the translator code cycle are applied one set to each end of the primary winding of transformer CP14. The leakage inductance of the centre tapped secondary winding of transformer CP14 together with the centre tapped capacitor CP121-2 and resistor CP111-2 constitute a terminated half section low pass filter. The pulses comprising the two sets of digits applied to the opposite ends of the winding have the same polarity and the same amplitude within reasonable limits so that whenever the two sets of digits are identical substantially no current flows in the primary winding and no corresponding voltage is produced across the secondary winding provided the two sets of pulses coincide exactly in time. If the two sets of pulses are displaced in time by a small fraction of the duration of one pulse a short pulse of current flows in the primary winding during the non-coincident period of each pair of pulses. The low pass filter discriminates against such short pulses and the secondary winding voltage produced is only a corresponding fraction of the voltage produced by a pulse of digit pulse duration. Such a small secondary winding voltage as produced by such a short pulse is insufficient to cause either of the rectifiers CP151, CP152 to conduct so that there is no effect upon lead CP11 which lead has means to maintain it at a small negative potential. Whenever the digits of a translator code differ from the digits in the storage system, one or more full pulses energise the primary winding of transformer CP14 and a negative potential is produced at one end of the secondary winding which causes either rectifier CP151 or CP152 to conduct and transfer the major part of this negative potential to lead CP11.

Thus whenever a translator code is identical with the first appearance of the digits stored in the circulating system the device CP1 produces no effect upon lead CP11. But whenever a translator code differs from the said stored digits the device CP1 produces a negative pulse on the lead CP11 for each pulse which differs.

*b. Translation enterer U1.*—The device U1 consists of a valve V8 having connected in its anode circuit the primary winding of transformer U14 which is supplied with a positive potential from lead 901. The secondary winding of transformer U14 is connected to a chain of resistors U112-4, of which the remote end of U114 is connected to a negative potential E7. The grid of V8 is connected to a point on this resistor chain having a negative potential sufficient to hold the anode current of V8 cut off. A tertiary winding of transformer U14 is connected to a load resistor U116 and a rectifier U151 in such a way that when V8 conducts a potential is produced across U116 which is just sufficient to cause U151 to conduct. The major part of the potential applied to lead 901 is in this case caused to be across the primary of U14 and only a small part of it across V8 so that the voltage across each of the windings of U14 are fairly accurately defined. The secondary winding of U14 is arranged to apply a positive potential to resistor U112 when V8 is conducting such that current flows to the grid of V8 holding V8 in the conducting condition.

V8 is caused to conduct by a positive pulse P6 at the register time of cycle division p60 applied to lead 60 and via capacitor U122 and rectifier U153 to the grid of V8. This pulse charges the capacitance U123 which maintains V8 in the conducting state until the necessary positive potential is produced by the secondary winding of U14. The resistor U111 which may conveniently be the reverse current resistance of U153 maintains a potential on capacitor U122 such that U153 is just on the verge of conduction when V8 is cut off.

Resistor U115 applies a bias current to the secondary winding of U14 so that the full range of magnetisation of the core of this transformer may be available for use.

Lead CP11 is connected to the junction of resistors U113 and U114 which point is chosen to have a small negative potential when V8 is in the conducting condition. A small negative pulse applied to lead CP11 is then conveyed to the grid of V8 via the capacitor U121 and charges capacitor U123 to a negative potential sufficient to cut off the anode current of V8. Capacitor U123 maintains this negative potential until after the positive potential on one end of the secondary winding of U14 has dropped to zero, thus maintaining the cut off condition on the grid of V8.

*c. Service class selector S1.*—The device S1 provides for either one of the two translator translation cycles T12 and T13 to be applied to lead S12 corresponding to the translator code cycle T11 according to the class of service required.

In the unseized condition, both the wire S11 and S13 are arranged to have negative potentials sufficient to prevent both of the rectifiers S151 and S152 conducting when pulses occur on T12 or T13. In the seized condition a positive potential is applied to either S11 or S13 to cause one of the rectifiers S151 or S152 to conduct. Pulses from one translator translation code cycle are then applied to lead S12. The resistors S111 and S112 are so arranged as to apply a negative potential to lead S12 such that the pulses on S12 do not cause rectifier U151 to conduct unless V8 is set in its conducting condition.

*d. Eraser of translated digits 90.*—In device 90 a positive potential E5 is applied via decoupling components 9011 and 9022 and the rectifier 9052 to lead 901, which lead supplies the anode potential for the valves in devices U1, U2, etc, for example, V8 in U1. A positive pulse P20 occupying the register time of cycle divisions p120 to p60 is applied via lead 902 and capacitor 9021 to one end of the primary winding of transformer 904. The other end of this primary winding is connected to lead 901. For the duration of each impulse of the pulse P20 and provided that none of the valves in the units U1, U2, etc. is then conducting, the whole primary of 904 rises in potential above that of E5 and no voltage is produced in the secondary of 904. If, however, one of the valves, for example V8, is conducting during the pulse P20 the lead 901 is held at about potential E5 with rectifier 9052 conducting and the pulse energises the transformer 904, its secondary voltage being applied to the lead 91, and being a replica of the pulse P20. The resistor 9013 causes a bias current to flow in the primary of transformer 904 such that the full range of magnetisation of its core may be used. Rectifier 9051 with resistor 9012 in series restore the D. C. level of the off condition of P20 to the potential E5.

Each of the devices CP2, U2, S2, etc., is similar to the corresponding devices CP1, U1, S1, but is connected with a different translator code cycle and correspondingly different translator translation cycles so as to provide access to the desired number of translations.

The translation pulses which may be gated through units U1, U2, U3, U4, for example via rectifier U151, are applied to lead 145 and via rectifier 1455 to lead 141. The outputs from units U5 to U8 are similarly applied via rectifier 1465 to lead 141 and so on. Practical limitations in the properties of the rectifiers make it necessary to include additional rectifiers such as 1455, 1465 in the commoning.

Having now described the functioning of each of the devices CP1, U1, S1, and 90 and their method of interconnection the complete operation of replacing the second appearance of the register pulses with a digital translation will be summarized.

*e. Summary of translating operation.*—The pulse P6 at register time p60 causes the valve in each of the units U1, U2, etc. to conduct and within the period of register time p61 to p100 the devices CP1, CP2, etc. compare the first appearance of the register pulses with the translator codes within the translator code cycles to which they are connected. For each translator code which differs from the register pulses the devices U1, U2, etc. emit one or more negative pulses and cut off the valve in their respective unit U1, U2, etc. so that no further effect occurs. Whenever a translator code is identical with register pulses one of the devices CP1, CP2, etc. does not emit a negative pulse and its corresponding unit U1, U2, etc. remains in the condition of valve conducting causing the second appearance of digits in the circulation system to be erased and the digital translation corresponding with this translator code to be applied via lead 141 to be stored in the circulating system.

(6) *Extracting data from register.*—*a. Information digit detector 201 (Fig. 9).*—When a translation is stored in the circulating system the digital translation digits are followed in order, either directly or after an interval left for further code digits, by an information digit of five pulses. This information digit is eventually shifted into the register time of cycle divisions p196 to p200, indicating that the extraction of digits for setting up of a connection may commence, and at this position it is detected by the devices 201 and 202 of Fig. 9. Positive register pulses are applied to lead 2011 which is connected to one end of the primary of transformer 2014 in device 201. To the other end of the primary a positive pulse P7, consisting of a combination of the pulses at the register time of cycle divisions p196 to p200 is applied via the capacitor 20121 and rectifier 20151. Current flows in the primary of 2014 during any part of the pulse period of p196 to p200 which is not occupied by a pulse on lead 2011. Thus 2014 is energised continuously by P7 unless the information digit is in the register time position p196 to p200. 2014 is not energised by the positive register pulses on lead 2011 because rectifier 20151 does not conduct to these pulses.

*b. Extractor actuator 202 (Fig. 9).*—A positive potential E4 is applied to lead 20141 which is one end of the secondary winding of transformer 2014. When 2014 is energised by P7, the secondary voltage is rectified by 20152 and smoothed by capacitor 20122 so that the positive potential on lead 2013 is much less than E4 and not sufficient to cause the cold cathode valve V10 in device 202 to conduct. When transformer 2014 is no longer energised, the potential of lead 2013 rises as capacitor 20122 charges via resistor 20112 to the potential E4 which is sufficiently positive to ensure that V10 then conducts. When V10 conducts, the lead 162 connected to its cathode assumes a positive potential which signals to device 601 that the information digit has been detected. The anode lead 161 of V10 is connected to means, not shown, for providing either a suitable positive potential to allow the valve to conduct or a reduced potential to reset V10 to its non-conducting state. Also means, not shown, are provided for applying to lead 152 either a potential suitable for making rectifier 20151 conduct to pulses P7 or else a potential suitably more negative to ensure that 20151 does not conduct to pulses P7. The latter facility permits 2014 not to be energised irrespective of the register pulses and thus provides alternative means for allowing V10 to conduct and produce a signal on lead 162.

Figure 10:
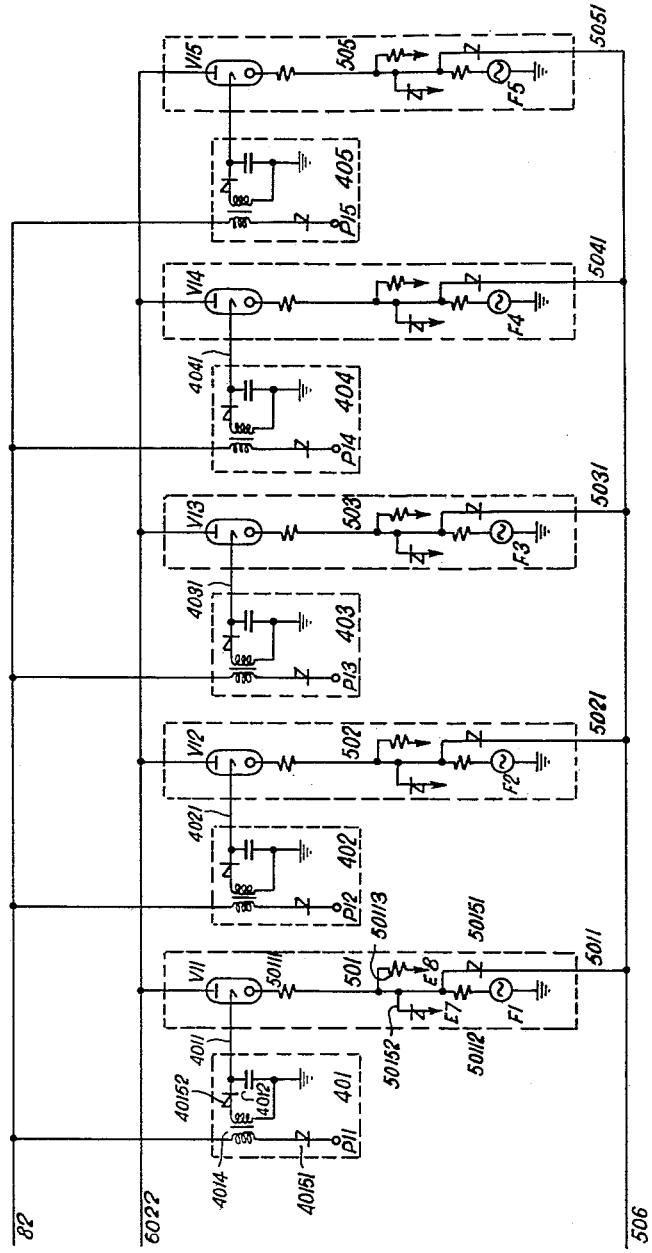

A signal on lead 162 of Fig. 9 permits the device 601, by means not shown, to request the register to transfer to it the stored translation one digit at a time. This request is given by applying an increased negative potential to lead 6011. V17 in device 602 is normally conducting and the potential of its anode and lead 6022 connected to it is then low enough to ensure that the cold cathode valves V11—V15 in devices 501 to 505 of Fig. 10 are reset to their non-conducting state and held in that state by anode current flowing mainly in resistor 60211 of Fig. 9 connected to a high positive potential E1 and rectifier 60252 and partly in resistor 30113, also connected to E1, of device 301. The increased negative potential on lead 6011 cuts off the anode current of V17 and the potential of lead 6021 rises due to current through resistor 30113 until rectifier 30151 conducts, holding the potential of leads 6021 and 6022 to E4 which is a suitable positive potential not sufficient alone to cause valves V11—V15 to conduct. The two ends of rectifier 30152 are then held at the same potential E4 by the two resistors 30111 and 30112 so that a positive pulse P8 applied to lead 3011 passes through rectifier 30152 and capacitor 30121 to lead 3012.

*c. Extractor 8 (Fig. 9)*.—The device 8 contains a pentode valve V6 which has in its anode circuit the primary winding of transformer 841 connected across part of the anode load resistors 811, 812. The capacitor 826 serves to prevent D. C. from magnetising the transformer core. The anode is also connected via capacitor 821 and lead 85 to the suppressor grid of V1 in Fig. 12. The secondary winding of transformer 841 is connected to the series resistors 815 and 813, a negative potential E7 being applied to 813, and the grid of V6 being connected to the junction of 815 and 813 which point has a negative potential sufficient to prevent flow of current in V6. A positive pulse applied to lead 3012 causes rectifier 851 to conduct, charging capacitor 823 so that the grid of V6 is at about earth potential. Anode current flows in V6 and the anode potential falls to a low value so that the major part of the potential E3 now occurs across the resistor 811 and smaller parts of it across the valve and also across the resistor 812 and the primary winding of transformer 841. A positive potential is thereby produced on the end of the secondary winding of 841, which is connected to resistor 815 causing current to flow to the grid of V6 thus holding V6 in the conducting condition.

*d. Extraction from entry means 1 (Fig. 12)*.—The suppressor grid of V1 of Fig. 12 is normally held at cathode potential by current flowing from the positive potential E1 through resistor 114 and rectifier 154 to the cathode circuit of V1 such that 154 is conducting. When V6 conducts, the potential of lead 85 becomes negative and the suppressor grid of V1 is cut off such that the current that would otherwise flow to its anode now flows in its screen circuit. Positive D. C. register pulses are applied to the control grid of V1 causing V1 to conduct, and in this case pulses from the screen of V1 via lead 86 energise the transformer 842 of Fig. 9 which produces positive pulses on lead 82. The resistors 817 and 818 are chosen so that the connection of 817 to a potential E7 gives the secondary winding of 842 a steady negative potential of, for example, 20 volts at which one end of it is held by the capacitor 825, and, in addition, so that the steady current flowing in rectifier 853 is not less than current which can flow in the secondary of 842 as the result of a pulse applied to V1 when the suppressor of V1 is at cathode potential. The end of rectifier 853 not connected to the secondary winding of 842 is connected via capacitor 824 to earth. Thus the pulses in the screen current of V1 occurring during normal circulation of pulses in the storage system are shunted by the forward conduction of rectifier 853 and do not produce pulses on lead 82 of more than negligible amplitude. When the suppressor grid of V1 is cut off, the pulses in its screen current are of about four times normal current so that rectifier 853 is cut off by lead 82 being driven positively until rectifier 854 conducts and limits the positive excursion of the pulses to earth potential.

*e. Extracted digit pulse and analyzer et seq. (Fig. 10)*.—Pulses on lead 82 are applied to each of the devices 401 to 405 of Fig. 10. In addition negative pulses P11 to P15 are applied to devices 401 to 405. P11 consists of pulses at the register time of cycle division $p5n+1$ where $n$ is all the integers from 1 to 40. Similarly P12 to P15 consist of pulses at the cycle times $p5n+2$ to $p5n+5$ respectively. Any one impulse on lead 82 must coincide with one of the impulses of P11 to P15, and will operate one of the devices 401 to 405. For illustration it will be assumed that the device 401 is operated. In this case the impulse on lead 82 coincides with an impulse of P11 so that rectifier 40151 conducts and an impulse is applied to the primary of the transformer 4014. If the pulses P11 to P15 have an amplitude of, for example, 20 volts, then about 20 volts will be impressed on the primary of 4014 during the impulse. The transformer is designed so that a greater voltage is induced in its secondary winding which causes the rectifier 40152 to conduct and charge the capacitor 4012 to a positive potential. The leakage inductance of the secondary winding of 4014 is chosen in conjunction with the capacitance 4012 and the resistance of the rectifier 40152 so that the greatest possible potential is attained on 4012 during the impulse. After the impulse has gone, the capacitor 4012 discharges relatively slowly through the reverse resistance of the rectifier 40152 maintaining its potential long enough to ensure that the potential applied by the lead 4011 to the grid of V11 in device 501 causes V11 to conduct. The use of a particular value of leakage inductance in the secondary winding of transformer 4014 is definitely advantageous in obtaining an increased potential on capacitor 4012. Other impulses on lead 82 occurring within the duration of the same digit will similarly operate devices 402 to 405 and 502 to 505.

*f. One digit per extraction controller 303*.—The impulses on lead 82 of Fig. 9 are also applied via lead 3022 to device 303, and a pulse P10 is applied to lead 3032. P10 consists of a short negative pulse coincident with the K2 pulse at the register time of the end of cycle division $p5n$ where $n$ is all the integers from 1 to 40. When lead 82 has a potential of 20 volts negative, for example, this potential is conveyed via resistors 30312 and 30313 to the junction of capacitor 30321 and rectifier 30354. Hence rectifier 30354 does not conduct to pulse P10 provided P10 is of no greater amplitude than 20 volts.

The other end of capacitor 30321 is connected to lead 3031 which is normally held at earth potential by a current from a positive potential E3 flowing through resistor 30311 and rectifier 30351 which conducts to earth. A positive going impulse on lead 3022 charges capacitor 30321 via the current limiting resistor 30312 and rectifier 30353 so that rectifier 30354 conducts to the negative pulse P10. The next impulse of P10 is therefore applied to the lead 3031. Capacitor 30321 slowly resumes its former state with a time constant of, for example, 30 microseconds as current flows through the high resistor 30313.

A negative impulse applied to lead 3031 of Fig. 9 causes rectifier 852 to conduct and charges capacitor 823 to a negative potential cutting off V6. This action immediately restores normal circulation of pulses by bringing the suppressor grid potential of V1 back to the potential of V1 cathode. Capacitor 823 maintains a negative potential on the grid of V6 whilst transformer 841 becomes de-energised and the positive potential on resistor 815 is removed, leaving V6 cut off again.

The conduction of one or more of the cold cathode valves V11 to V15 causes a current to be drawn from lead 6022 which exceeds the current flowing in resistor 30113. Consequently the positive potential of lead 6022 is decreased, cutting off rectifiers 30151 and 30152 via lead 6021, and causing rectifier 60252 to conduct. The current in resistor 60211 holds rectifier 60251 conducting to a potential E5 which is less positive than E4 but sufficient to permit any or all of the cold cathode valves V11 to V15 to be made conducting in the manner previously described. The cutting off of rectifier 30152 by making its junction with capacitor 30122 negative with respect to its other end prevents its conduction in response to the pulse P8. Hence after a digit has been extracted from the circulating system and V6 has been made non-conducting by the gated pulse P10, V6 cannot be made conducting again by a further pulse P8 until the devices 501 to 505 have been reset, and a further request for a digit has been received on lead 6011.

*g. Extraction cycle limiter 8*.—If, after a digit has been requested and V6 has been made conducting by the P8 pulse gated onto lead 3012, no digit occurs on lead 82 before the register time of the end of cycle division $p200$, then the negative pulse P9 which is coincident with the K2 pulse at this register time and which is applied to lead 83 causes rectifiers 855 and 852 to conduct cutting off the valve V6. V6 is made to conduct again by the next impulse of the P8 pulse. This process continues until a digit is stored in the circulating system and read out as described.

*h. Analyzed digit recaster 501 et seq. 1* (Fig. 10).—When any one of the valves V11 to V15 of Fig. 10 conducts, for example in device 501 V11 conducts, signals are conveyed to device 601 along the leads 5011 to 5051. Electric signals, for example, sources of alternating current of suitably different frequencies F1 to F5 may be connected to devices 501 to 505 respectively. For example, F1 may be connected to the resistor 50112 causing an alternating current to flow to the junction of rectifier 50152 and resistor 50113, the other end of 50152 being connected to a negative potential E7 of, for example, 50 volts and the rectifier being held conducting by a direct current through resistor 50113 connected to a more negative potential E8 of, for example, 100 volts such that the direct current is greater than the peak value of the alternating current in resistor 50112. Thus practically no alternating voltage occurs across rectifier 50152 due to the source F1 and a direct current potential of 50 volts negative is applied via resistor 50111 to the cathode of V11. Rectifier 50151 is normally cut off so that no current flows in lead 5011. When V11 conducts, rectifier 50152 is cut off by the cathode current in resistor 50111 and rectifier 50151 conducts. The alternating current in resistor 50112 then flows through rectifier 50151 and leads 5011 and 506 to the device 601. When, for example, a normal digit coded in the form of two pulses is extracted from the circulating system, two frequencies corresponding to the two stored pulses are emitted by the devices 501 to 505 and received by the device 601.

*E. Epilogue and claims.*—It will be seen from the preceding description that the invention provides relatively simple and inexpensive register-translator apparatus designed to record and store a large number of incoming digits and translation digits, to translate a large number of numbers represented by any first number of the incoming digits and to impose a minimum of restriction on the exchange codes and subscribers numbers used in a telephone system.

It will be appreciated that the use of a supersonic delay line as a pulse storage device in the manner described, presents advantages of flexibility in use and economy in apparatus.

What is claimed is:

1. An automatic telephone exchange system including in combination a register, impulse storing means in said register, said impulse storing means comprising iterative pulse-storage apparatus, a source of impulses connected to said iterative pulse-storage apparatus, means for causing said impulses to circulate in said storing means through said storage apparatus, a second source of impulses connected to said storage apparatus and means responsive to impulses circulating through said storage apparatus in cooperation with impulses from said second source of impulses.

2. An automatic telephone exchange system according to claim 1 in which said means for causing said impulses to circulate through said storage apparatus is timed so that said impulses circulate repeatedly in a time cycle composed of an integral number of cycle sectors each comprising a group of cycle divisions, and in which items of information representing digits are stored in the form of coded impulses each in one sector group of cycle divisions, each sector group containing an identical number of cycle divisions.

3. An automatic telephone exchange system according to claim 1, in which said means for causing said impulses to circulate in said impulse storing means is timed so that said impulses circulate repeatedly in a time cycle composed of an integral number of cycle sectors each comprising a group of cycle divisions, in which items of information representing digits are stored in the form of coded impulses each in one sector group of cycle divisions, each sector group containing an identical number of cycle divisions, and in which all the digits received in the register as impulses are stored in the impulse storing apparatus in predetermined parts of the circulating cycle; further comprising means for shifting impulses representing digits received by the register from the sector into which they are introduced from incoming circuits, such impulses always being introduced into the storing apparatus at the same predetermined part or parts of the circulating cycle and then being shifted to a preselected degree together with any impulses circulating elsewhere in the storing apparatus at the time the introduced digit is being shifted.

4. An automatic telephone exchange system according to claim 3, further comprising means for introducing the impulses representing digits into the storing apparatus at two parts of the circulating cycle, corresponding cycle divisions in each part of the circulating cycle being separated from those in the other part by one half of the complete cycle.

5. An automatic telephone exchange system according to claim 3, the means for shifting the impulses comprising an electrical delay line having electronic switching means for including and excluding it from the circulation system and a delay period equal to the time by which it is desired to shift the impulses circulating in the circulating system.

6. An automatic telephone exchange system according to claim 3, in which the shifting means advances the digits in the time cycle, the shifting means comprising an electrical delay line having electronic switching means and having a delay period equal to the time by which it is desired to advance the impulses circulating in the circulating system and arranged so that normally the circulating path includes both the electrical delay line and the impulse storing means but that when the advancement of the circulating impulses is required, the electrical delay line is by-passed by the electronic switching means for a period less than the circulating time of the system.

7. An automatic telephone exchange system according to claim 6, the electronic switching means controlling the advancement of the circulating impulses being switchable only in a part of the circulating cycle when no impulses are circulating in the electrical delay line.

8. An automatic telephone exchange system according to claim 3, comprising means by which a set of stored information represented by impulses may be replaced by impulses from an external source such as a translator, the shifting means being operable for the shifting of the stored information regardless of the change when impulses are introduced into the normal input sector of the circulating cycle.

9. An automatic telephone exchange system according to claim 8, comprising means by which one of two sets of stored information represented by impulses may be replaced by impulses from an external source such as a translator while the other set of stored information represented by impulses remains unchanged.

10. An automatic telephone exchange system according to claim 8, said system comprising means by which replacement from an external source is permitted to occur more than once in any one use of the register.

11. An automatic telephone exchange system according to claim 3, further comprising a selecting device and means by which the information required to control the selecting device is extracted digit by digit from the circulating cycle and removed from the digits circulating in the system.

12. An automatic telephone exchange system according to claim 11, and in which the information required to control the selecting devices is extracted digit by digit from the circulating cycle by digit ascertaining means comprising digit storage apparatus, the path for the impulses circulating in the circulating system being diverted by the digit extraction means to the said digit storage apparatus at a point in the circulating system and at a predetermined time in the cycle at that point when no impulses are passing the said point, the path for the impulses circulating in the circulating system being restored by the digit extracting means when the impulses of a digit from the circulating system have flowed into the said digit storage apparatus.

13. An automatic telephone exchange system according to claim 11, the path for the impulses circulating in the circulating system being diverted by the digit extracting means to the said digit storage apparatus at a point in the circulating system and at a predetermined time in the cycle at that point when no impulses are passing the said point, and the path for the impulses circulating in the circulating system being restored by the digit extracting means at a further predetermined part of the circulating system cycle if no digit impulses have flowed into the digit storage apparatus when the further predetermined part of the circulating system cycle is reached.

14. An automatic telephone exchange system according to claim 3, and further comprising means by which a signal that the register has sufficient information to enable selecting devices to commence their operations may be derived from a coded signal placed in a part of the circulating cycle by impulses received from an external source, said signal deriving means being operative only if the coded signal is placed in a predetermined part of the circulating cycle.

15. An automatic telephone exchange system according to claim 3, and in which the translator uses an iterative cycle having a repetition time equal to the minimum intertrain pause of the signalling system used by incoming circuits connected to the register, the translator iterative cycle being synchronously related to the iterative cycle of the register.

16. An automatic telephone exchange system according to claim 15, and in which the iterative cycle of the translator comprises coded impulse sets in groups within the iterative cycle and synchronous with the cycle divisions of the register.

17. An automatic telephone exchange system according to claim 15, and in which each cycle of the translator iterative cycle comprises an integral number of intervals each of duration equal to and synchronous with the circulation cycle time of the register, each such interval in an iterative cycle being associated with its own coded impulses.

18. An automatic telephone system according to claim 15, including means for providing a plurality of translation cycles all associated with a given code and means in the registers for selecting the translation cycle to be used according to instructions signalled to the register.

19. An automatic telephone exchange system according to claim 3, the system including a generator of iterative coded impulses having a repetition time and synchronous with the register iterative cycle, comprising pulse generators all of repetition time equal to the register iterative cycle repetition time, each pulse generator being synchronous with one only of the cycle divisions of the register iterative cycle and means to connect any combination of pulse generators to a common gating circuit.

20. An automatic telephone exchange system according to claim 19, the system including a plurality of iterative coded impulse generators having the outputs of all their common gating circuits connected to a common circuit, the gating circuits being normally of high attenuation being made of low attenuation by pulses of such duration and so spaced in time that each of the gating circuits allows through one cycle of its own coded impulses in turn to the common circuit and repeating that transmission to the common circuit once every translator iterative cycle.

21. A system according to claim 20 including at least two pluralities of generators forming part of a translator and in which the individual pluralities are used to generate codes or translations.

22. A system according to claim 20 in which the gating circuits comprise static rectifier networks, the rectifiers being normally biased to cause the gating circuits to offer a large attenuation to signals attempting to pass through them and in which the gating pulses bias the rectifiers so that the gating circuits then offer a low attenuation to signals attempting to pass through them.

23. A system according to claim 20 arranged to generate on separate leads codes and corresponding translations, each code or translation comprising a group of coded impulses and having a repetition rate equal to the register cycle repetition time, the codes occupying the first parts of the register circulating cycle and the translations the second parts of the register circulating cycles.

24. An automatic telephone exchange system including in combination a register, a translator, impulse storing means in said register, said impulse storing means comprising a supersonic delay line, a source of impulses connected to said supersonic delay line, means for causing said impulses to circulate in said storing means through said supersonic delay line, a second source of impulses connected to said supersonic delay line from said translator and means responsive to impulses circulating through said supersonic delay line in cooperation with impulses from said second source of impulses.

25. An automatic telephone exchange system according to claim 24 in which said means for causing said impulses to circulate through said supersonic delay line is timed so that said impulses circulate repeatedly in a time cycle composed of an integral number of cycle sectors each comprising a group of cycle divisions and in which items of information representing digits are stored in the form of coded impulses each in one sector group of cycle divisions, each sector group containing an identical number of cycle divisions.

26. An automatic telephone exchange system according to claim 24, including means by which coded impulses from a translator may be placed in such a part of the register storage circulating system that impulses stored in the register may be automatically advanced in order that the advancement of the stored impulses may cause that part of the register storage which is compared with the translator code cycles to seek coincidence with a different code cycle if such exists.

27. An automatic telephone exchange system including in combination, at least two registers, a translator common to said registers, means for permanently connecting said registers to said translator, impulse storing means in each of said registers, said impulse storing means comprising iterative pulse-storage apparatus, a source of impulses connected to said iterative pulse-storage apparatus, means for causing said impulses to circulate in said storing means through said storage apparatus, a second source of impulses connected to said storage apparatus and means responsive to impulses circulating through said storage apparatus in co-operation with impulses from said second source of impulses.

28. An automatic telephone exchange system according to claim 27 in which said means for causing said impulses to circulate through said storage apparatus is timed so that said impulses circulate repeatedly in a time cycle composed of an integral number of cycle sectors each comprising a group of cycle divisions, and in which items of information representing digits are stored in the form of coded impulses each in one sector group of cycle divisions, each sector group containing an identical number of cycle divisions.

29. An automatic telephone system according to claim 27 in which one of two sets of stored information circulating in the registers is continuously compared at a predetermined part of the storage cycle with all the code cycles of a common translator and means in each register for detecting when the coded impulses in the translator relating to the code cycle coincide with those circulating in the register storage and means for gating into the circulating storage system of the register or registers detecting such a coincidence coded impulses relating to the translation for the code concerned and means whereby the said coded impulses for the translation are caused to occupy a part of the register storage cycle other than that used for code comparison with the translator, such information as may have been previously stored in the part of the register storage cycle not concerned with code comparison being erased.

30. An automatic telephone exchange system including at least two registers, a translator common to said registers, means for permanently connecting said registers to said translator, impulse storing means in each of said registers, said impulse storing means comprising a supersonic delay line, a source of impulses connected to said supersonic delay line, means for causing said impulses to circulate in said storing means through said supersonic delay line, a second source of impulses connected to said supersonic delay line from said common translator and means responsive to impulses circulating in said supersonic delay line through co-operation with impulses from said second source of impulses.

31. An automatic telephone exchange system according to claim 30 in which said means for causing said impulses to circulate through said supersonic delay line is timed so that said impulses circulate repeatedly in a time cycle composed of an integral number of cycle sectors each comprising a group of cycle divisions and in which items of information representing digits are stored in the form of coded impulses each in one sector group of cycle divisions, each sector group containing an identical number of cycle divisions.

32. A register comprising iterative pulse-circulating means having a primary time cycle including an integral number of cycle sectors each comprising a predetermined number of cycle divisions, means for coding digits as predetermined permutations of pulses substantially coincident with cycle divisions of one of said sectors, and pulse entering means for injecting said coded digit pulses into said pulse circulating means in the corresponding intervals of said sector.

33. A register according to claim 32, further comprising means responsive to the introduction of pulses into said sector for altering the time cycle of said pulse circulating means to shift said pulses into the next adjacent cycle sector thereof.

34. A register according to claim 33, said pulse entering and shifting means comprising means for inhibiting action of said pulse shifting means while pulses are being entered into said pulse circulating means.

35. A register according to claim 33, said pulse shifting means having an operation period equal to the number of cycle sectors provided for the iterative storage of digits, for shifting the pulses of all the iteratively stored digits up to the said number in response to the introduction of pulses into said first sector.

36. A register according to claim 35, said pulse circulating and shifting means comprising means for inhibiting action of said pulse shifting means when stored digit pulses have been shifted to all of the cycle sectors provided for the iterative storage of digits.

37. A register according to claim 33, the primary time cycle of the pulse circulator providing, and the pulse coding and pulse entering means injecting digit pulses into, two of said first cycle divisions spaced apart by half the primary circulation cycle of the pulse circulating means.

38. A register according to claim 37, further comprising translating means responsive to digits entered and shifted in one half of the circulation cycle of said pulse circulating means for selecting translations for such digits pulse coded in the predetermined permutations, for erasing the corresponding digits from the other half of circulation cycle of said pulse circulating means, and for entering the translations thereof in selected sectors of said other half.

39. A register according to claim 38, in which the translating means provides at least two alternative translations in response to digits entered and shifted in one half of the circulation cycle, and includes means responsive to class of service signals for selecting one of said alternative translations for entry in the pulse circulating means.

40. A register according to claim 38, in which said translating means is responsive to a first set of digits entered in said circulation cycle for substituting a first translation thereof, and also responsive to at least one other set of digits when said other set appears in said circulation cycle, for substituting a second translation therefor.

41. A register according to claim 38, in which said translating means enters in said pulse circulating means as a part of its translation an information digit; combined with means activated by the presence of said information digit in the pulse circulating means for extracting digits from said pulse circulating means.

42. A combination according to claim 41, in which said digit extracting means extracts the digits from said pulse circulating means in the order in which they are circulated therein.

43. A combination according to claim 42, in which said digit extracting means extracts only a single digit from the pulse circulating means in any given circulation cycle thereof.

44. Apparatus for storing data comprising a circulating circuit having a primary circulation time cycle divided into an integral number of equal sectors each accommodating an equal group of cycle time divisions, means for coding data items as permutations of impulses, each corresponding to one of said cycle time divisions with the impulses representing each data item falling within one sector group of time divisions, means for introducing the impulses representing one data item into the circulating circuit in one particular time sector thereof, means for altering the circulation time of at least one circulation cycle of said circulating circuit by the algebraic addition thereto of one integral number of time sectors in a portion of the time circulation cycle not containing stored pulses to shift the coded data from said particular time sector without loss thereof, and means for thereafter introducing the impulses representing another data item into the circulating circuit in the same particular sector of its primary time cycle.

45. Apparatus according to claim 44, further comprising means for detecting the presence in the circulating system of pulse coded primary data for which it is desired to substitute other pulse coded data, means for effecting such detection following the shifting of the detected data, means for selecting data coded in the same permutation system to be substituted for the detected data, means for interrupting the circulating circuit during the interval when the detected data would otherwise be passing through the point of interruption, means for introducing the other data into the circulating circuit, and means for altering the circulation time of the circuit as aforesaid to shift from said particular time sector coded data introduced thereinto by the substitution.

46. Apparatus according to claim 45, said detecting, selecting, interrupting, introducing and altering means being operable in the interval between the introduction of primary data items into said particular time sector of the circulation cycle.

47. Apparatus according to claim 45, further comprising means for introducing into a particular time sector of the circulating circuit pulse coded information data, means for detecting the presence of said information data in the circulating circuit, and means responsive to such detection for extracting the first one of a series of data items in the circuit from the time sector occupied by it, while allowing the remainder of the data items to continue to circulate in the circuit.

References Cited in the file of this patent

UNITED STATES PATENTS

| | | |
|---|---|---|
| 2,212,173 | Wheeler et al. | Aug. 20, 1940 |
| 2,308,778 | Prince | Jan. 19, 1943 |
| 2,493,379 | Anderson et al. | Jan. 3, 1950 |
| 2,577,141 | Mauchly et al. | Dec. 4, 1951 |